(12) United States Patent
Kosugi et al.

(10) Patent No.: US 7,841,321 B2
(45) Date of Patent: Nov. 30, 2010

(54) CANISTER AND METHOD OF MANUFACTURING THE SAME

(75) Inventors: Ryuji Kosugi, Obu (JP); Tsuneyuki Yokochi, Obu (JP); Tomonari Toki, Obu (JP)

(73) Assignees: Aisan Kogyo Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 1313 days.

(21) Appl. No.: 11/338,879

(22) Filed: Jan. 25, 2006

(65) Prior Publication Data

US 2006/0196480 A1    Sep. 7, 2006

(30) Foreign Application Priority Data

Jan. 28, 2005  (JP)  ............................. 2005-020920
Jan. 28, 2005  (JP)  ............................. 2005-020921
Dec. 28, 2005  (JP)  ............................. 2005-378578

(51) Int. Cl.
*F02M 33/02*  (2006.01)

(52) U.S. Cl. .................................................... 123/519
(58) Field of Classification Search ................. 123/519; 29/888.01; 96/143
See application file for complete search history.

(56) References Cited

U.S. PATENT DOCUMENTS 5,632,808 A * 5/1997 Hara et al. ..................... 96/137
5,861,050 A * 1/1999 Pittel et al. ..................... 95/115
6,279,548 B1 * 8/2001 Reddy ......................... 123/520

(Continued)

FOREIGN PATENT DOCUMENTS

JP    63-057351    4/1988

(Continued)

OTHER PUBLICATIONS

"New Applications of Plastics & Light Metals," UBE Automotive News, Modern Plastics International, UBE Industries Ltd., 6 pages total, Mar. 2004 with partial English translation.

(Continued)

*Primary Examiner*—Hai H Huynh
(74) *Attorney, Agent, or Firm*—Dickinson Wright PLLC

(57) ABSTRACT

In a canister and a method of manufacturing a canister, in order to restrain a temperature rise of an adsorptive material owing to adsorption of an evaporated fuel (gasoline vapor) or to restrain a temperature drop of the adsorptive material during purging of the adsorbed gasoline vapor and to increase adsorbing and purging amounts, or in order to improve adsorbing and purging performances of the evaporated fuel, there is disposed a thermal storage material constituted of a phase change substance which absorbs and discharges latent heat in response to a temperature change or a thermal storage material microcapsule constituted by confining the thermal storage material in a microcapsule in a state in which the material or the microcapsule is not brought into direct contact with the evaporated fuel, and especially in the vicinity of the adsorptive material in a heat-conduction state, so that the temperature change is restrained by the thermal storage material in response to the temperature rise or drop of the adsorptive material to prevent deterioration of the adsorbing performance of an activated carbon due to the temperature rise and deterioration of the purging performance of the activated carbon due to the temperature drop.

20 Claims, 28 Drawing Sheets

U.S. PATENT DOCUMENTS

| | | | |
|---|---|---|---|
| 6,488,748 B2 * | 12/2002 | Yamafuji et al. | 96/131 |
| 6,503,301 B2 * | 1/2003 | Uchino et al. | 96/132 |
| 6,524,374 B2 * | 2/2003 | Moriyama et al. | 96/131 |
| 7,008,470 B2 * | 3/2006 | Makino et al. | 96/131 |
| 7,047,952 B1 * | 5/2006 | Yamauchi et al. | 123/519 |
| 7,175,698 B2 * | 2/2007 | Matsuura et al. | 96/134 |
| 7,309,381 B2 * | 12/2007 | Yamazaki et al. | 95/153 |
| 7,323,041 B2 * | 1/2008 | Yoshida et al. | 96/132 |
| 7,507,278 B2 * | 3/2009 | Makino et al. | 96/132 |
| 7,543,574 B2 * | 6/2009 | Yamazaki et al. | 123/519 |
| 7,600,506 B2 * | 10/2009 | Kopinsky | 123/516 |
| 7,615,108 B2 * | 11/2009 | Yoshida et al. | 96/108 |
| 7,670,412 B2 * | 3/2010 | Kido et al. | 96/147 |
| 2002/0020398 A1 * | 2/2002 | Kimoto et al. | 123/519 |
| 2005/0247202 A1 | 11/2005 | Seki | |
| 2006/0144228 A1 * | 7/2006 | Reiners et al. | 95/144 |
| 2008/0028939 A1 * | 2/2008 | Kido et al. | 96/147 |
| 2008/0302245 A1 * | 12/2008 | Yoshida et al. | 96/146 |
| 2009/0266236 A1 * | 10/2009 | Kosugi et al. | 96/152 |
| 2009/0294094 A1 * | 12/2009 | Suzuki et al. | 165/10 |

FOREIGN PATENT DOCUMENTS

| | | | |
|---|---|---|---|
| JP | 64-036962 | | 2/1989 |
| JP | 5156570 | | 6/1993 |
| JP | 7133745 | | 5/1995 |
| JP | 07-310977 | | 11/1995 |
| JP | 08-224754 | | 9/1996 |
| JP | 10339218 | | 12/1998 |
| JP | 11152466 | | 6/1999 |
| JP | 2000 186635 | | 4/2000 |
| JP | 2000-257516 | | 9/2000 |
| JP | 2001-129307 | | 5/2001 |
| JP | 2001 145832 | | 5/2001 |
| JP | 2001-234817 | | 8/2001 |
| JP | 2001-248504 | | 9/2001 |
| JP | 2003-268344 | | 9/2003 |
| JP | 2003 311118 | | 11/2003 |
| JP | 2003-314387 | | 11/2003 |
| JP | 2004-270043 | | 9/2004 |
| JP | 2005-325707 | * | 11/2005 |
| JP | 2005-325708 | * | 11/2005 |
| JP | 2006-063859 | | 3/2006 |
| JP | 2006-68693 | * | 3/2006 |
| JP | 2006-233962 | * | 9/2006 |
| JP | 2008-25365 | * | 2/2008 |
| JP | 2008-69680 | * | 3/2008 |
| JP | 2008-221046 | * | 9/2008 |
| JP | 2009-287395 | * | 12/2009 |
| JP | 2010-7671 | * | 1/2010 |
| WO | 03/106833 | | 12/2003 |

OTHER PUBLICATIONS

Japanese Office Action dated Aug. 11, 2009 with English translation thereof.
Japanese Office Action dated Dec. 8, 2009 with English translation thereof.
English Translation of Japanese Office Action dated May 11, 2010.
Japanese Office Action dated Jul. 28, 2010, with English translation.

* cited by examiner

FIG.4A
FIG.4B
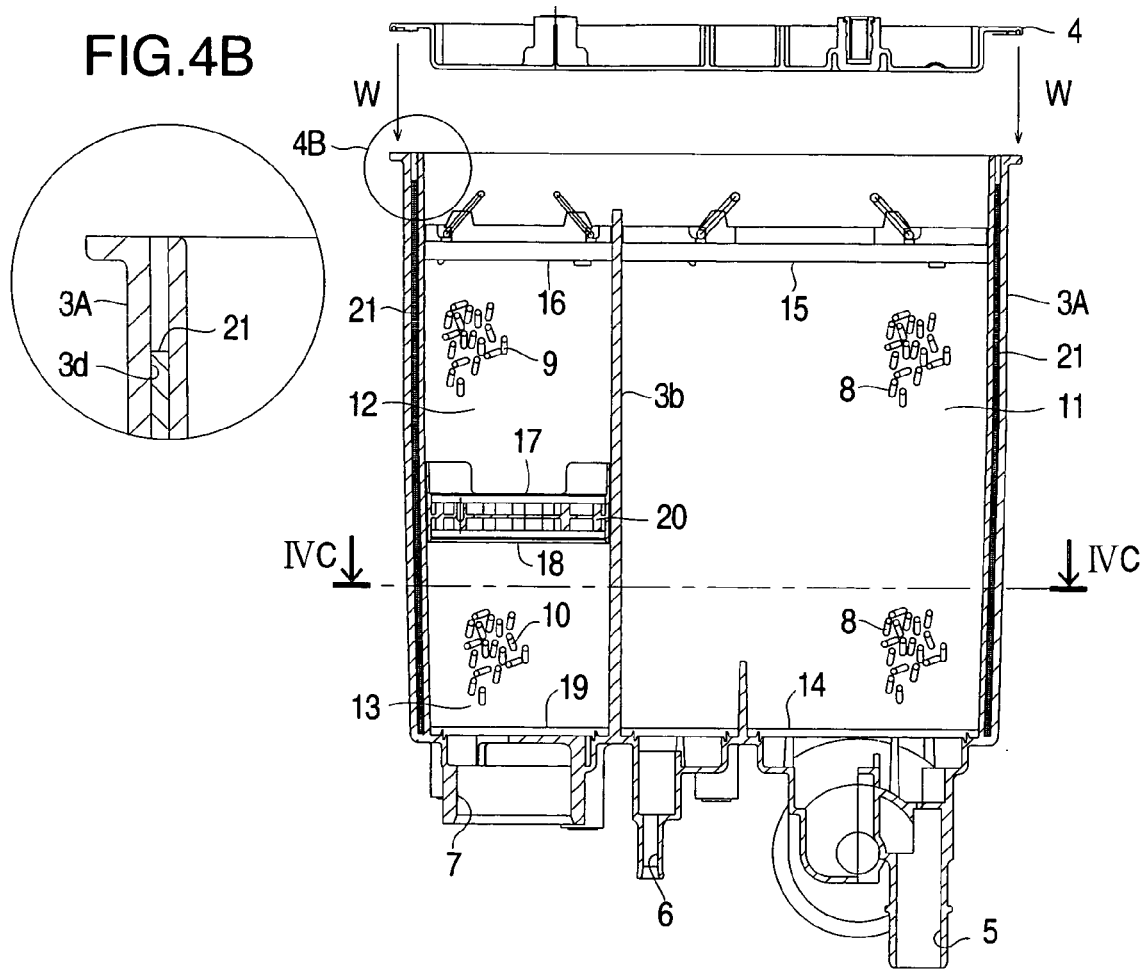
FIG.4C
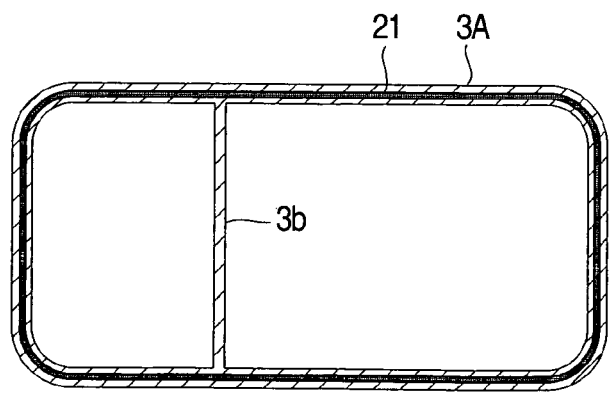

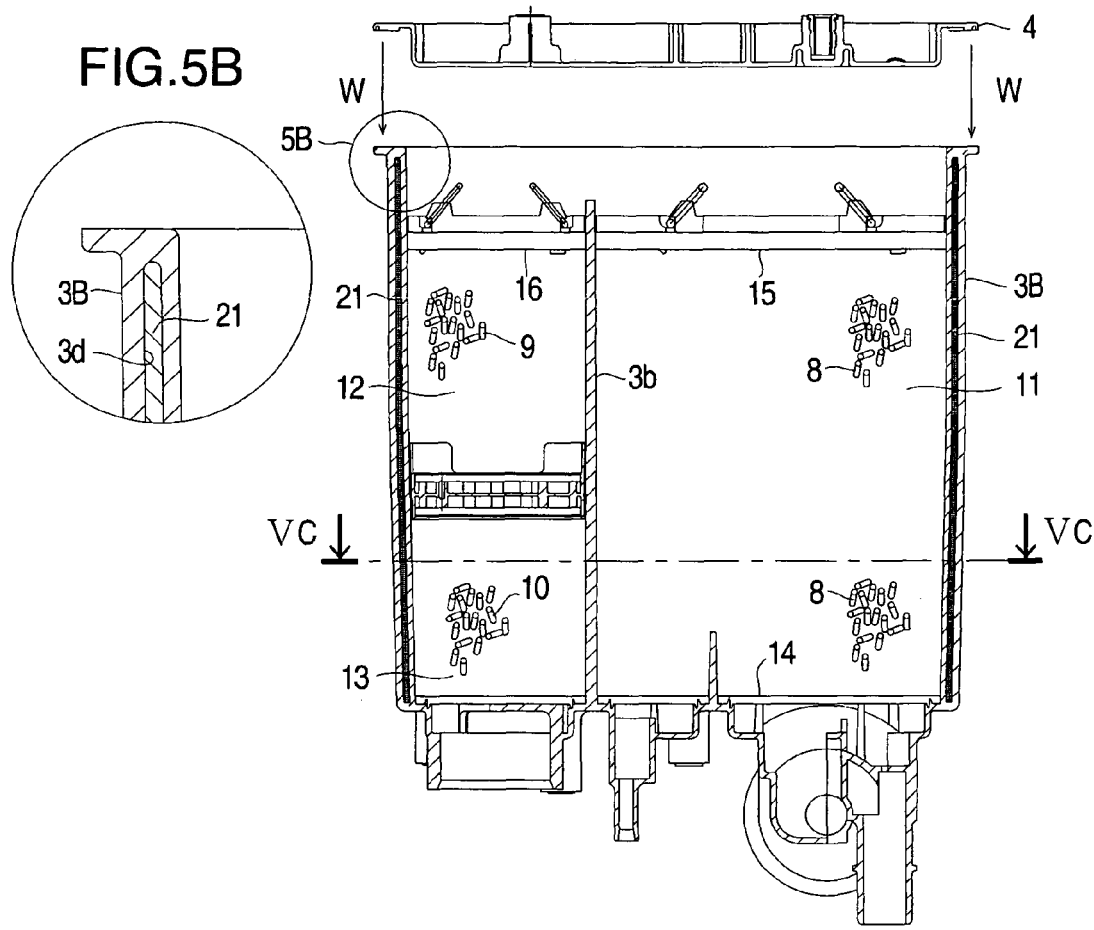
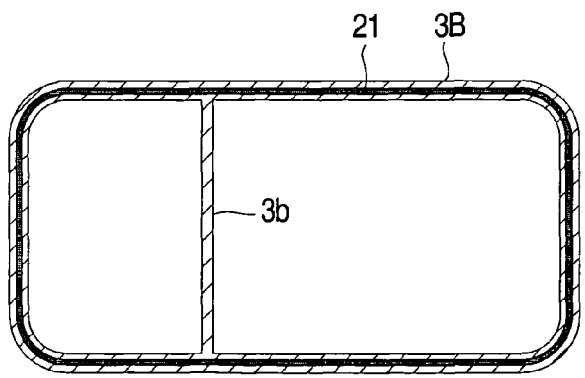

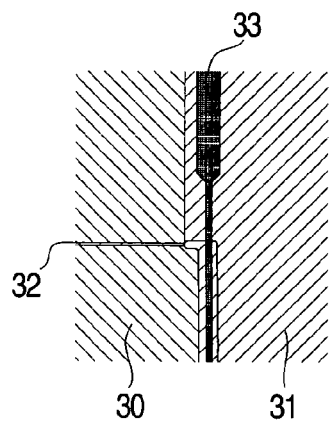
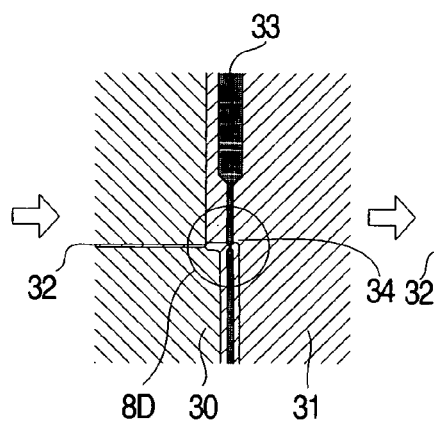
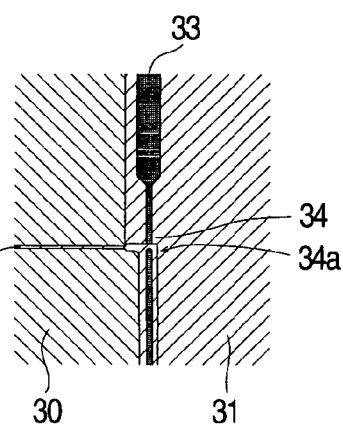
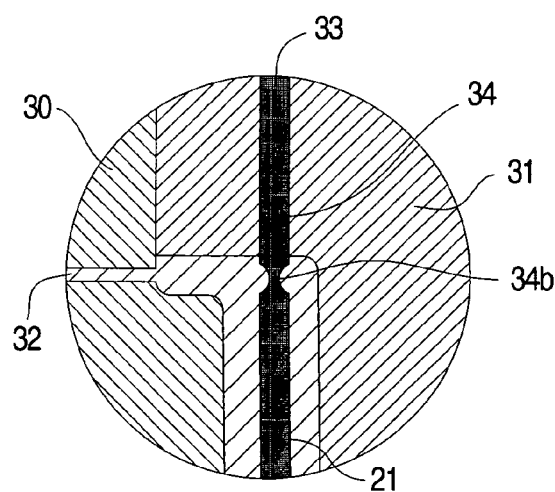

FIG.15A
FIG.15B
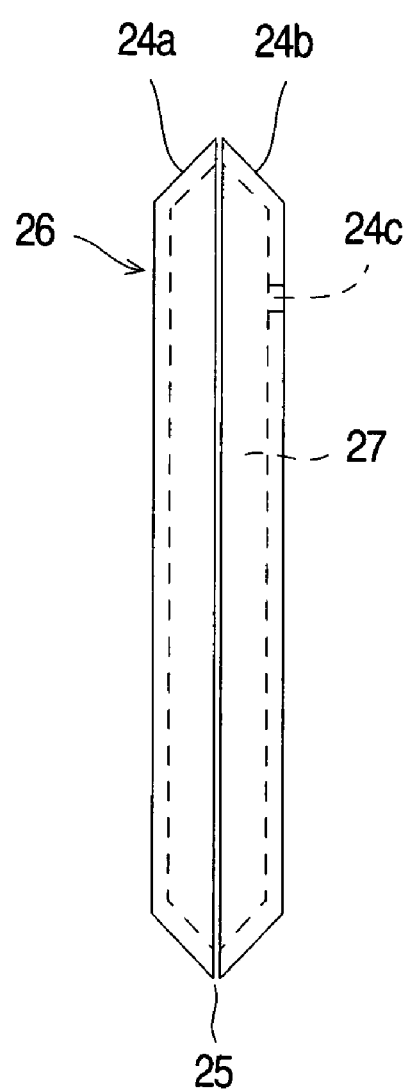
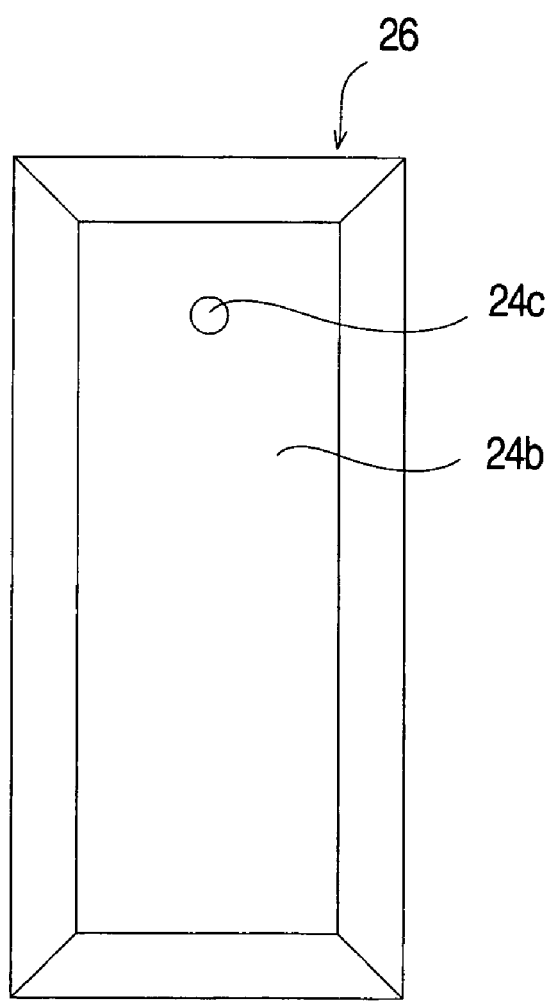

FIG.16A
FIG.16B
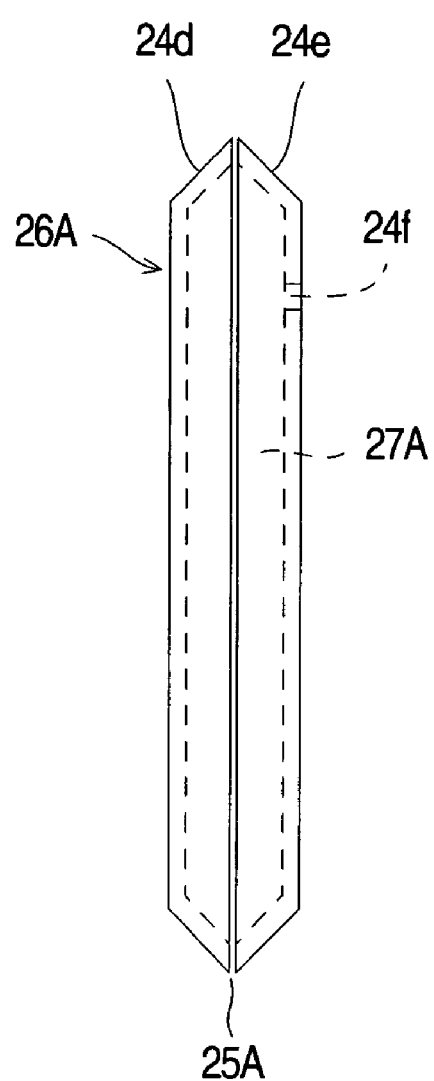
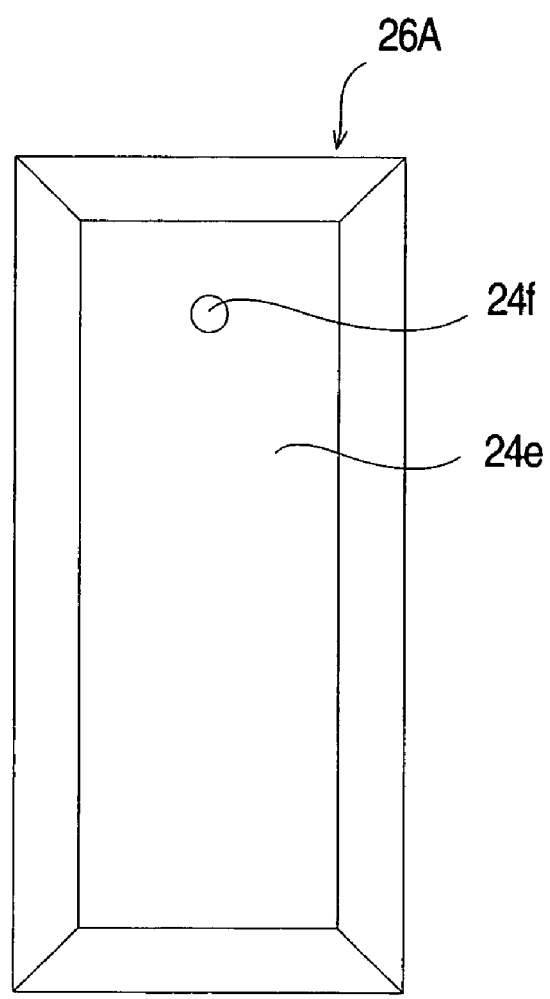

CANISTER AND METHOD OF MANUFACTURING THE SAME

BACKGROUND OF THE INVENTION

1. Field of the Invention

The present invention relates to a canister for use in an evaporated fuel treatment device of an internal combustion engine, a method of manufacturing a canister, and a method of manufacturing a sealed container in a canister.

2. Description of the Related Art

From JP-A-2000-186635 and so on, there is known a canister for use in an evaporated fuel treatment device for an internal combustion engine, having an adsorptive material chamber which contains an adsorptive material for adsorbing evaporated fuel; a tank port connected to a fuel tank; a purge port connected to a suction port of the engine; and an atmospheric port opened to the atmosphere. The canister disclosed in this publication is proposed by the present applicant, and activated carbon is used as the adsorptive material.

Moreover, from JP-A-10-339218 and so on, there is known an evaporated fuel treatment device of using, as an adsorptive material to be charged in a container of the evaporated fuel treatment device, an activated carbon adsorptive material which is substantially uniformly provided, on the surface of a particulate adsorption base material made of activated carbon, with thermal storage particles made of metal material such as iron or copper having a large thermal conductivity and a large thermal capacity as compared with the activated carbon.

Furthermore, from JP-A-11-152466 and so on, there is known a thermal storage material microcapsule whose average particle diameter is set to 0.1 to 25 µm and in which a weight ratio of a thermal storage material in a microcapsule solid is set to a range of 60 to 75%, as a thermal storage material microcapsule utilizing latent heat (melting or coagulating heat) in addition to sensible heat of the thermal storage material itself. In the publication, it is described that this microcapsule is used as a thermal storage material or a heat conveying medium for use in heating a building, a house or the like.

In the canister for the evaporated fuel treatment device of the internal combustion engine, as disclosed in JP-A-10-339218, a temperature rise of activated carbon during fuel adsorption and a temperature drop of activated carbon during purging of an adsorptive fuel are restrained by use of the sensible heat of the thermal storage particles. Therefore, in order to improve the restraining effect, it is necessary to use the thermal storage particles having large specific heat and large gravity, and thus, there has been a first problem that weight of the canister increases.

To solve the problem, the thermal storage material microcapsule disclosed in JP-A-11-152466 is mixed with an adsorptive material such as activated carbon, and the mixture is disposed in the adsorptive material chamber, and the temperature rise or drop of an adsorptive material such as activated carbon is restrained by use of the latent heat of the thermal storage material in the microcapsule. This is supposed to be convenient because the temperature change of the adsorptive material can be effectively restrained by use of the thermal storage material microcapsule which is lighter than the thermal storage particles utilizing the sensible heat. However, since the film forming the thermal storage material microcapsule is made of thin resin, there is a fear of a second problem that gasoline vapor (HC) as fuel vapor of the internal combustion engine passes through the film to change a melting point of the thermal storage material.

Moreover, in JP-A-2000-186635, there is known a canister that has an adsorptive material holding filter for holding the adsorptive material to be stored in the adsorptive material chamber.

Furthermore, from JP-A-2003-311118 and so on, there is known a latent heat storage type adsorptive material constituted of the thermal storage material and the adsorptive material containing in the microcapsule a phase change substance which absorbs and discharges the latent heat in response to the temperature change. On the surfaces of the adsorptive material particles is provided the thermal storage material having a particle diameter which is smaller than that of the adsorptive material.

In JP-A-2000-186635, there are not any measures for improving an adsorption performance of the adsorptive material. In JP-A-10-339218, the sensible heat of the thermal storage particles is utilized as the measures for improving the adsorption performance of activated carbon. However, there is a problem that there is little effect of improving the performance because the sensible heat is utilized. Furthermore, in JP-A-2003-311118, there is not referred to any canister for use in the evaporated fuel treatment device of the automobile internal combustion engine.

SUMMARY OF THE INVENTION

In the present invention, a first object is to provide a canister for an evaporated fuel treatment device of an internal combustion engine and a method of manufacturing a canister, which can solve the first and second problems.

Therefore, the most important characteristics of the present invention lie in that a thermal storage material utilizing latent heat is introduced into a case in a state detached from gasoline vapor to restrain a temperature rise during adsorption of the gasoline vapor into an adsorptive material and a temperature drop during purging.

To achieve the first object, according to a first aspect of the present invention, there is provided a canister comprising: a tank port which communicates with an upper gas chamber of a fuel tank; a purge port which communicates with a suction path of an engine; an atmospheric port opened to the atmosphere; and an adsorptive material chamber which contains an adsorptive material adsorbing an evaporated fuel flowing from the tank port to the atmospheric port, wherein a thermal storage material made of a phase change substance which absorbs and discharges latent heat in response to a temperature change or a thermal storage material microcapsule containing the thermal storage material is disposed in the canister, especially in the vicinity of the adsorptive material in a state in which the thermal storage material or the microcapsule is not brought into direct contact with the evaporated fuel.

According to a second aspect of the present invention, in the canister of the first aspect, the thermal storage material or the thermal storage material microcapsule is disposed in a case forming the adsorptive material chamber of the canister.

According to a third aspect, in the canister of the second aspect, the thermal storage material microcapsule is kneaded into a resin material making the case.

According to a fourth aspect, in the canister of the second aspect, a chamber is disposed in a case portion forming a peripheral wall of the adsorptive material chamber, and the chamber is filled with the thermal storage material or the thermal storage material microcapsule.

According to a fifth aspect of the present invention, there is provided a canister comprising: a tank port which communicates with an upper gas chamber of a fuel tank; a purge port which communicates with a suction path of an engine; an atmospheric port opened to the atmosphere; and an adsorptive material chamber which contains an adsorptive material for adsorbing an evaporated fuel flowing from the tank port to the atmospheric port, wherein a chamber is disposed in a case portion forming a peripheral wall of the adsorptive material chamber, and the chamber is filled with a thermal storage material made of a phase change substance which absorbs and discharges latent heat in response to a temperature change or a thermal storage material microcapsule containing the thermal storage material.

According to a sixth aspect, in the canister of the first aspect, the thermal storage material made of the phase change substance which absorbs and discharges the latent heat in response to the temperature change or the thermal storage material microcapsule encapsulating the thermal storage material is contained in a sealed container made of a material which does not pass any gasoline vapor so as to constitute pellets, and the pellets are contained in the adsorptive material chamber together with the adsorptive material.

According to a seventh aspect, in the canister of the sixth aspect, the sealed container containing the thermal storage material or the thermal storage material microcapsule is made of metal.

According to an eighth aspect, in the canister of the sixth aspect, the sealed container containing the thermal storage material or the thermal storage material microcapsule is made of a resin film laminated with metal foil.

According to a ninth aspect, in the canister of the first aspect, a metal plating is applied to an outer periphery of the thermal storage material microcapsule.

According to a tenth aspect of the present invention, there is provided a method of manufacturing a canister, comprising the steps of: molding a case body which forms a peripheral wall of an adsorptive material chamber and has an opening at one end, by means of gas assisting molding, so as to form a space portion in the peripheral wall; injecting a thermal storage material or a thermal storage material microcapsule into the space portion; and closing the opening with a lid.

According to an eleventh aspect of the present invention, there is provided a canister manufacturing method for molding a case body which forms a peripheral wall of an adsorptive material chamber and has an opening at one end, by means of the following steps (1) to (6):

(1) injecting a resin having an amount which is slightly smaller than a volume in a mold from a resin material gate into the mold;

(2) injecting a thermal storage material from a thermal storage material gate into the resin before the resin solidifies;

(3) lowering an injection pressure of the thermal storage material;

(4) raising a pressure of the resin again to allow the resin to flow into the mold;

(5) sealing the thermal storage material gate with the inflowing resin; and (6) cooling and solidifying the resin in the mold, and removing from the mold the case body which contains the thermal storage material.

According to a twelfth aspect, in the canister of the sixth aspect, the sealed container containing the thermal storage material or the thermal storage material microcapsule is made of a material having a specific heat or a thermal conductivity which is larger than that of the adsorptive material.

According to a thirteenth aspect, in the canister of the twelfth aspect, the material of the sealed container is a metal such as a copper material, an aluminum material, an iron material, a stainless steel material or the like.

According to a fourteenth aspect, in the canister of the twelfth aspect, the material of the sealed container is a resin such as nylon, polyacetal, polyphenylene sulfide, phenol or the like.

According to a fifteenth aspect of the present invention, there is provided a method of manufacturing a sealed container in a canister, comprising the steps of: molding the sealed container provided with a space portion containing a thermal storage material or a thermal storage material microcapsule and an opening which communicates with the space portion, by means of gas assisting molding; injecting the thermal storage material or the thermal storage material microcapsule into the molded space portion; and sealing the opening.

According to a sixteenth aspect of the present invention, there is provided a method of manufacturing a sealed container in a canister, comprising the steps of: molding the sealed container provided with a peripheral wall which surrounds a space portion and an opening which is disposed in the peripheral wall and which communicates with the space portion, by means of gas assisting molding so as to form the space portion in the peripheral wall; injecting a thermal storage material or a thermal storage material microcapsule into the space portion; and sealing the opening with a lid.

According to a seventeenth aspect of the present invention, there is provided a method of manufacturing a sealed container in a canister, for molding the sealed container containing a thermal storage material by means of the following steps (1) to (6):

(1) injecting resin having an amount which is slightly smaller than a volume in a mold from a resin material gate into the mold;

(2) injecting the thermal storage material from a thermal storage material gate into the resin before the resin solidifies;

(3) lowering an injection pressure of the thermal storage material;

(4) raising a pressure of the resin again to allow the resin to flow into the mold;

(5) sealing the thermal storage material gate with the inflowing resin; and (6) cooling and solidifying the resin in the mold, and removing from the mold the sealed container which contains the thermal storage material.

According to the first aspect of the present invention, the canister restrains a temperature rise during the adsorption of the adsorptive material utilizing latent heat of the thermal storage material or a temperature drop during the purging. When only a small amount of thermal storage material is used, the temperature rise or drop of the adsorptive material can be restrained more efficiently, and the adsorbing/purging amount of the adsorptive material can be increased as compared with thermal storage particles utilizing sensible heat in a conventional art. As a result, performance of the canister is improved. Since the evaporated fuel does not penetrate the film of the thermal storage material microcapsule, there is no problem that a melting point of the thermal storage material changes with the evaporated fuel, and characteristics of the canister change.

In the canister of the second to fifth aspects, the resin constituting the case securely separates the thermal storage material or the thermal storage material microcapsule from the evaporated fuel, and both of the thermal storage material or the thermal storage material microcapsule and the evaporated fuel are not brought into direct contact with each other.

In the canister of the seventh and eighth aspects, the thermal storage material or the thermal storage material microcapsule is surrounded with the metal container or the metal foil, and is not brought into direct contact with the evaporated fuel.

In the canister of the ninth aspect, the metal plating which covers the microcapsule insulates it with the evaporated fuel.

Therefore, in the canister of the second to ninth aspects, the latent heat of the thermal storage material can be effectively utilized, and the characteristics of the canister are stabilized.

According to the canister manufacturing method of the tenth and eleventh aspects of the present invention, the thermal storage material or the thermal storage material microcapsule can be easily confined in the case of the canister, and cost increases of the canister can be inhibited.

In the canister of the twelfth aspect, since the specific heat or the thermal conductivity of the sealed container is larger than that of the adsorptive material, it is possible to further restrain the temperature change of the adsorptive material (activated carbon) during the adsorbing and the purging of the fuel vapor, that is, the temperature rise during the adsorbing of the evaporated fuel and the temperature drop during the purging, and the adsorbing and purging performances of the evaporated fuel are improved.

In the canister of the thirteenth aspect, since the specific heat or the thermal conductivity of the metal constituting the sealed container is larger than that of activated carbon, the temperature change of the adsorptive material during the adsorbing and the purging of the fuel vapor is further restrained, and the adsorbing and purging performances of the canister are improved.

In the canister of the fourteenth aspect, since the thermal conductivity of the resin constituting the sealed container is larger than that of the adsorptive material, the temperature change of the adsorptive material during the adsorbing and the purging of the fuel vapor is effectively restrained, and the adsorbing and purging performances of the canister are improved. Further, the sealed container is easily molded, and this is useful for reducing costs of the canister.

In the manufacturing method of the fifteenth aspect, the sealed container can be easily molded and inexpensive manufactured, and this is useful for reducing the costs of the canister.

In the manufacturing method of the sixteenth aspect, the sealed container can be easily and inexpensively molded, and the opening can be sealed simultaneously with the molding. This respect also contributes to cost reduction of the canister.

In the manufacturing method of the seventeenth aspect, since the thermal storage material can be confined in the sealed container more easily, it is possible to inhibit the cost increase of the canister.

Furthermore, with respect to JP-A-2000-186635, JP-A-10-339218, and JP-A-2003-311118, a second object of the present invention is to provide a canister for use in an evaporated fuel treatment device of an automobile internal combustion engine, capable of largely improving adsorbing and purging performances of an evaporated fuel by use of a thermal storage material constituted by confining in a microcapsule a phase change substance which absorbs and discharges latent heat in response to a temperature change.

Further, the most important characteristics of the present invention lie in that the thermal storage material constituted by confining in the microcapsule the phase change substance whose phase changes at a predetermined temperature is disposed and operated in a predetermined position of the canister and that the adsorbing or purging performance of activated carbon is improved using latent heat of the phase change.

To achieve the second object, according to an eighteenth aspect of the present invention, there is provided a canister for evaporated fuel treatment, comprising: a tank port which communicates with an upper gas chamber in a fuel tank of an automobile; a purge port which communicates with a suction path of an internal combustion engine of the automobile; an atmospheric port opened to the atmosphere; and an adsorptive material chamber to contain an activated carbon which adsorbs gasoline vapor flowing from the tank port to the atmospheric port, wherein a thermal storage material is disposed in a thermal conduction state to said activated carbon, and the thermal storage material is constituted by confining in a capsule, a sealed container, or a case body a phase change substance whose melting point is in a range of −10 to 90° C. and which absorbs and discharges latent heat in response to a temperature change.

Moreover, according to a nineteenth aspect of the present invention, in the canister of the first aspect, the thermal storage material is disposed in a thermal conduction state to the activated carbon, and the thermal storage material is constituted by confining in a capsule, a sealed container, or a case body a phase change substance whose melting point is in a range of −10 to 90° C. and which absorbs and discharges latent heat in response to a temperature change.

According to twentieth and twenty-first aspects, in the canister of the eighteenth and nineteenth aspects, a nonwoven cloth made of a fiber having a thermal storage property by bonding the thermal storage material thereto is used in a holding filter which holds an activated carbon contained in the adsorptive material chamber.

According to twenty-second and twenty-third aspects, in the canister of the eighteenth and nineteenth aspects, the melting point of the phase change substance is in a range of 10 to 45° C.

According to twenty-fourth and twenty-fifth aspects, in the canister of the eighteenth and nineteenth aspects, there is disposed a first thermal storage material in which the melting point of the phase change substance is in a range of 25° C. or more and 90° C. or less and/or a second thermal storage material in which the melting point is in a range of −10° C. or more and less than 25° C.

According to twenty-sixth and twenty-seventh aspects, in the canister of the eighteenth and nineteenth aspects, there is disposed a first thermal storage material in which the melting point of the phase change substance is in a range of 25 to 45° C. and/or a second thermal storage material in which the melting point is in a range of 10° C. or more and less than 25° C.

According to twenty-eighth and twenty-ninth aspects, in the canister of the twenty-fourth and twenty-fifth aspects, the first thermal storage material is not disposed near the atmospheric port.

According to thirtieth and thirty-first aspects, in the canister of the twenty-fourth and twenty-fifth aspects, only the second thermal storage material is partially disposed near the atmospheric port.

According to thirty-second and thirty-third aspects, in the canister of the twenty-sixth and twenty-seventh aspects, the melting point of the phase change substance is set at a predetermined temperature close to 25° C.

According to a thirty-fourth aspect, in the canister of the eighteenth aspect, the thermal storage material is mixed with the activated carbon and the mixture is disposed in the adsorptive material chamber.

According to a thirty-fifth aspect, in the canister of the eighteenth aspect, the thermal storage material is coated on the activated carbon, and disposed in the adsorptive material chamber.

According to a thirty-sixth aspect, in the canister of the eighteenth aspect, the thermal storage material is fed to the activated carbon and solidified therein so as to constitute a granulated carbon which is used as the adsorptive material.

According to thirty-seventh and thirty-eighth aspects, in the canister of the first and eighteenth aspects, a heat pipe is disposed in the adsorptive material chamber so as to direct a longitudinal direction of a heat pipe in a flow direction of gasoline vapor According to thirty-ninth and fortieth aspects, in the canister of the thirty-seventh and thirty-eighth aspects, a fin is attached to the heat pipe.

According to forty-first and forty-second aspects, in the canister of the first and eighteenth aspects, a heat pipe provided with a plurality of fins is bridged between adjacent adsorptive material chambers.

According to forty-third and forty-fourth aspects, in the canister of the first and eighteenth aspects, graphite is mixed with the activated carbon contained in the adsorptive material chamber.

In the canister of the eighteenth and nineteenth aspects of the present invention, when the gasoline vapor evaporated from the automobile fuel tank is adsorbed by the activated carbon, the heat of the activated carbon during temperature rise is absorbed by the latent heat of the phase change substance which changes the phase to melt the substance, and the temperature rise is restrained. Therefore, an adsorbing amount of the activated carbon increases, and performance of the canister is improved. While the internal combustion engine of the automobile is operating, the temperature drop of the activated carbon during the purging is restrained by the latent heat of the phase change substance of the thermal storage material which changes the phase to solidify the substance. Therefore, a purging amount of the adsorbed gasoline vapor increases, and the performance of the canister is improved.

In the canister of the twentieth and twenty-first aspects, the filter for holding the activated carbon restrains the temperature change by means of the function of the thermal storage material in response to the temperature rise or drop of the activated carbon. Therefore, the adsorbing or purging amount of the gasoline vapor increases, and the performance of the canister is improved.

In the canister of the twenty-second to twenty-seventh aspects, the performance of the container can be effectively utilized especially in the automobile.

In the canister of the twenty-eighth and twenty-ninth aspects, increase of the gasoline vapor blow-by to the atmosphere is avoided, and the adsorbing amount of the gasoline vapor during oil supply can be increased.

In the thirtieth and thirty-first aspects, by use of a small use amount of adsorptive material, the canister can deal with the U.S. DBL regulation on the gasoline vapor (HC) discharged to the atmosphere from a vehicle left to stand. The performance of the canister can be improved inexpensively. It is to be noted that in this invention, the second thermal storage material may be disposed in a portion of 2 to 35%, preferably 2 to 15% of an activated carbon volume of the canister, the portion being close to the atmospheric port.

In the thirty-second and thirty-third aspects, the canister can securely deal with the regulation on the canister.

In the canister of the thirty-fourth aspect, the thermal storage material can be mixed with the activated carbon to improve the adsorbing and purging performance.

In the canister of the thirty-fifth and thirty-sixth aspects, it is possible to prevent a disadvantage that the thermal storage material is separated from the activated carbon and particle classification (separation) occurs in each of them. Therefore, the canister is preferable as a canister to be vibrated as in the automobile.

In the canister of the thirty-seventh to forty-second aspects, since it is possible to reduce a temperature difference between the activated carbon on an upstream side close to the tank port and the activated carbon on a downstream side therefrom, the adsorbing and purging performances are improved.

In the canister of the forty-third and forty-fourth aspects, since it is possible to reduce the temperature difference between the activated carbons in the adsorptive material chamber by means of a thermal conducting function of graphite mixed with the activated carbon, the adsorbing and purging performances can be improved.

BRIEF DESCRIPTION OF THE DRAWINGS

FIG. 2A is a vertically sectional view, FIG. 2B is a partially enlarged sectional view of FIG. 2A, and FIG. 2C is a sectional view taken along the IIC-IIC line of FIG. 2A;

FIG. 3A is a vertically sectional view, and FIG. 3B is a sectional view taken along the IIIB-IIIB line of FIG. 3A;

FIGS. 4A to 4C are diagrams before a lid 4 is assembled in the Embodiment 2, FIG. 4A is a vertically sectional view, FIG. 4B is a partially enlarged sectional view of FIG. 4A, and FIG. 4C is a sectional view taken along the VIC-VIC line of FIG. 4A;

FIGS. 5A to 5C are diagrams before a lid 4 is assembled in Embodiment 3 according to the present invention, FIG. 5A is a vertically sectional view, FIG. 5B is a partially enlarged sectional view of FIG. 5A, and FIG. 5C is a sectional view taken along the VC-VC line of FIG. 5A;

FIG. 7A is a sectional view taken along the VIIA-VIIA line of FIG. 6, FIG. 7B is a sectional view taken along the VIIB-VIIB line of FIG. 6, and FIG. 7C is a sectional view taken along the VIIC-VIIC line of FIG. 6;

FIGS. 8A to 8D are explanatory views of a procedure (steps) of the method of molding the case in the Embodiment 3 of the present invention, FIGS. 8A to 8C are main part vertically sectional views showing the steps in order, and FIG. 8D is a partially enlarged view of FIG. 8B;

FIG. 10A is a sectional view taken along the XA-XA line of FIG. 9, and FIG. 10B is a sectional view taken along the XB-XB line of FIG. 9;

FIGS. 11A to 11C are main part vertically sectional views showing the steps in order, and FIG. 11D is a partially enlarged view of FIG. 11B;

FIG. 12A is a schematic diagram of a case portion of the canister, and FIG. 12B is an enlarged perspective view of a pellet for use in FIG. 12A;

FIG. 13A is a perspective view of a cylinder, and FIG. 13B is a perspective view of the pellets prepared from the cylinder of FIG. 13A;

FIG. 14A is a front view, and FIG. 14B is a plan view;

FIGS. 15A and 15B are explanatory views of a method of manufacturing a sealed container in Embodiment 13 according to the present invention, FIG. 15A is a front view, and FIG. 15B is a right side view of FIG. 15A;

FIGS. 16A and 16B are explanatory views of a method of manufacturing a sealed container in Embodiment 14 according to the present invention, FIG. 16A is a front view, and FIG. 16B is a right side view of FIG. 16A;

FIG. 17A is a front view of a sealed container, FIG. 17B is a left side view thereof, and FIG. 17C is a vertically sectional view showing a method of manufacturing the sealed container;

FIG. 18A is a vertically sectional view, and FIGS. 18B, 18C are partially enlarged step diagrams of FIG. 18A;

FIG. 21A is a vertically sectional view of a canister, and FIG. 21B is an enlarged perspective view of an activated carbon for use in the canister of FIG. 21A;

FIG. 22A is an explanatory view of a method of manufacturing the activated carbon, and FIG. 22B is a partially enlarged sectional view of the activated carbon;

FIG. 28A is a vertically sectional view, FIG. 28B is a sectional view taken along the XXVIIIB-XXVIIIB line of FIG. 28A, and FIG. 28C is a partially enlarged diagram of FIG. 28A;

FIG. 29A is a vertically sectional view, FIG. 29B is a sectional view taken along the XXIXB-XXIXB line of FIG. 29A, and FIG. 29C is a partially enlarged diagram of FIG. 29A;

DESCRIPTION OF THE PREFERRED EMBODIMENTS

Embodiments of the present invention will be described hereinafter in detail with reference to the drawings.

Embodiment 1

Figure 1:
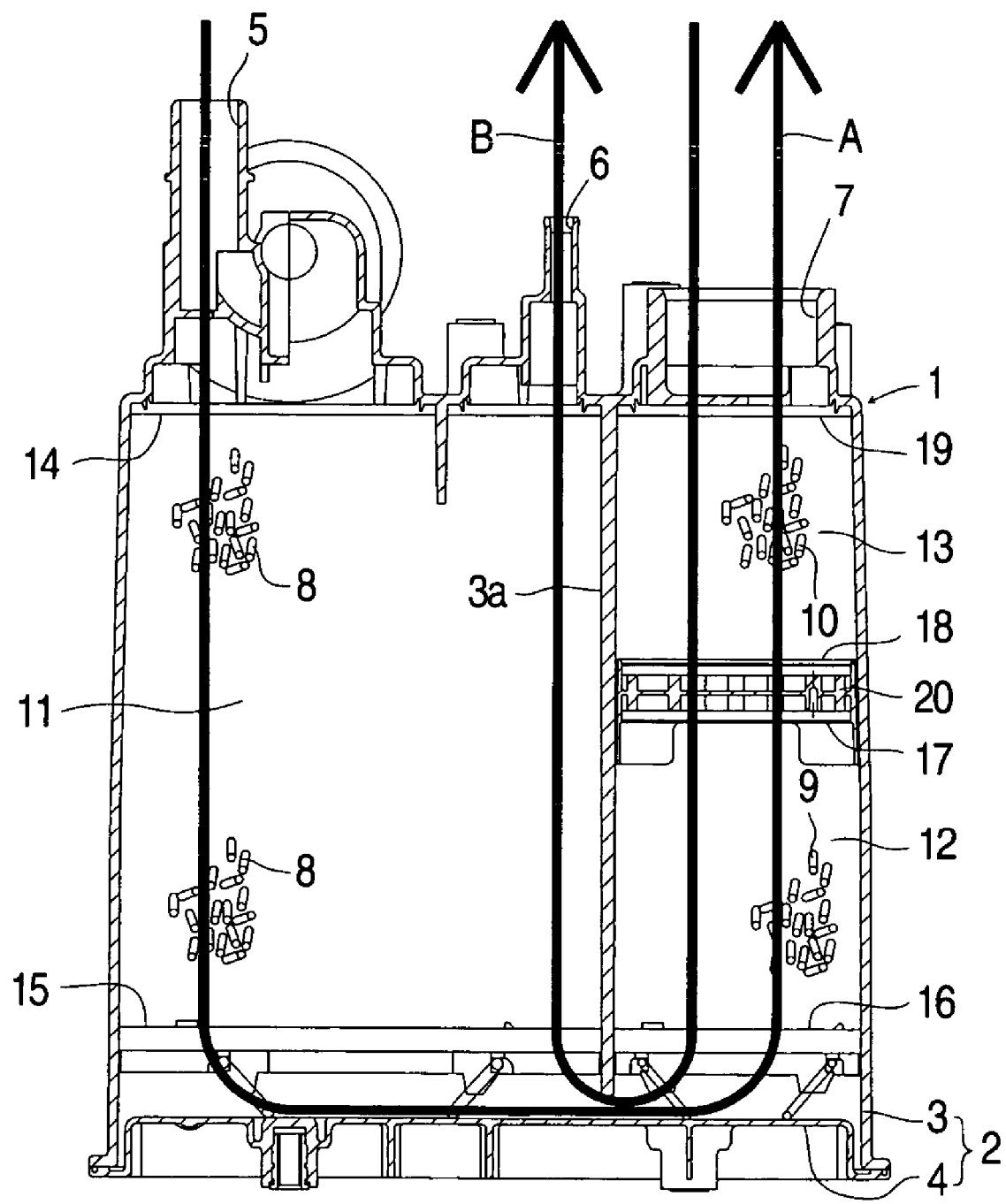
FIG. 1 is a vertically sectional view of Embodiment 1 according to the present invention.

Embodiment 1 in FIG. 1 corresponds to first to third aspects of the present invention. In the Embodiment 1, a case 2 of a canister 1 is constituted of: a case body 3 having an opening in a lower end thereof; and a lid 4 which closes the lower-end opening. In the top of the case body 3, there are formed: a tank port 5 which communicates with an upper gas chamber of a fuel tank of an automobile (not shown); a purge port 6 which similarly communicates with a suction path of an internal combustion engine; and an atmospheric port 7 opened to the atmosphere. In the case 2, a main adsorptive material chamber 11, a first sub-chamber 12, and a second sub-chamber 13 are arranged in order between the tank port 5 and the atmospheric port 7, which chambers contain adsorptive materials 8, 9, and 10, respectively. The adsorptive materials are made of an activated carbon which adsorbs gasoline vapor (HC) of an evaporated fuel flowing from the tank port 5 to the atmospheric port 7.

The case body 3 is injection-molded of nylon which is a resin material. During the injection molding, thermal storage material microcapsules are mixed into nylon pellets, and the thermal storage material microcapsules are kneaded to injection-mold the case body 3. As the thermal storage material microcapsule, there is used a thermal storage material microcapsule similar to that described in JP-A-11-152466. In the present invention, as a thermal storage material in the microcapsule, the gasoline vapor (HC) from a fuel tank flows from the tank port 5 into the main adsorptive material chamber 11. When the gasoline vapor is adsorbed by the adsorptive material 8, and temperature of the adsorptive material 8 rises, the thermal storage material in the thermal storage material microcapsule melts to absorb latent heat, and restrains a temperature rise of the adsorptive material 8 to increase the adsorbing amount of the adsorptive material 8. During the adsorption of the gasoline vapor into the adsorptive materials 9 and 10, the temperature rise is similarly restrained by the thermal storage material microcapsule kneaded in the case body 3.

Moreover, when the engine is operated, air inflowing from the atmospheric port 7 passes through the second sub-chamber 13, the first sub-chamber 12, and the main adsorptive material chamber 11 to flow out of the purge port 6 at the purging. During such purging, the gasoline vapor adsorbed in the adsorptive materials 10, 9, and 8 till that time is purged, and the temperature of each of the adsorptive materials 10, 9, and 8 drops. In this time, the temperature drop is detected by the thermal storage material microcapsule kneaded into the case body 3, the thermal storage material changes its phase from a liquid phase to a solid phase to generate heat and restrain the temperature drop, and the purging amount is therefore increased.

It is to be noted that in the Embodiment 1, as to the thermal storage material microcapsule kneaded into a partition plate 3a disposed in the case body 3, the thermal storage material therein changes its phase to restrain the temperature changes of the adsorptive materials 8, 9, and 10. It is to be noted that as the thermal storage material, there may be used a material having a melting point around 25° C. at which known adsorbing and purging cycles are performed to test an adsorbing or purging amount of butane as a main component of the gasoline vapor. For example, there is usable paraffin such as heptadecane whose melting point is 22° C. or octadecane whose melting point is 28° C.

In FIG. 1, reference numerals 14 and 15 denote filters which hold the adsorptive materials 8, 16 and 17 denote filters which hold the adsorptive materials 9, and 18 and 19 denote filters which hold the adsorptive materials 10. It is to be noted that in the Embodiment 1 of FIG. 1, an arrow A indicates a flow of gasoline vapor or air flowing from the tank port 5 into the canister 1 to flow to the atmospheric port, for example, during supplying of oil to the fuel tank. Arrow B indicates a flow during the purging in the engine operation. A plate 20 disposed between the filters 17 and 18 is a vapor diffusion preventive plate (buffer plate) provided with a diaphragm which restrains diffusion of the gasoline vapor between the first sub-chamber 12 and the second sub-chamber 13.

In addition, in the Embodiment 1 of FIG. 1, the first sub-chamber 12 and the second sub-chamber 13 are literally referred to as the sub-chambers, but they substantially constitute the adsorptive material chambers to contain the adsorptive materials in the same manner as in the main adsorptive material chamber 11, and the first and second sub-chambers are constituted as the adsorptive material chambers.

Embodiment 2

Figure 2A:
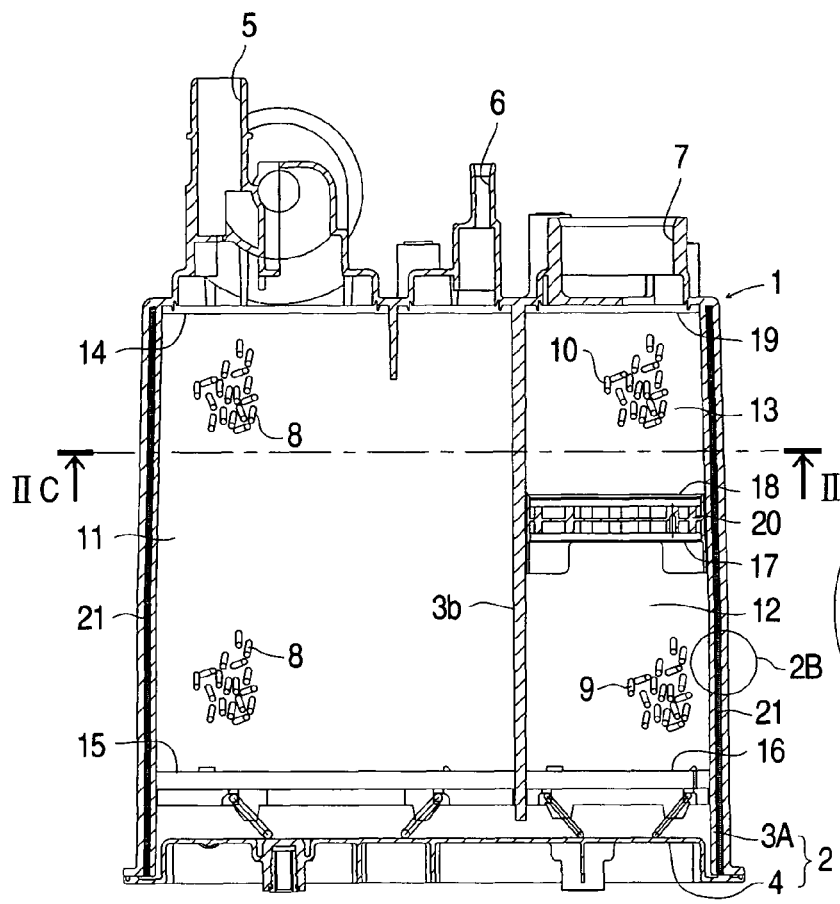
FIGS. 2A to 2C show Embodiment 2 according to the present invention.
Figure 2B:
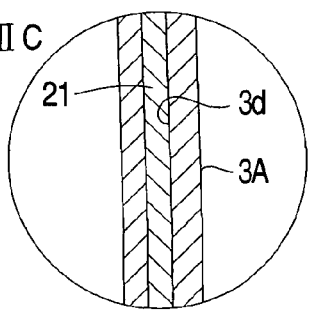
Figure 2C:
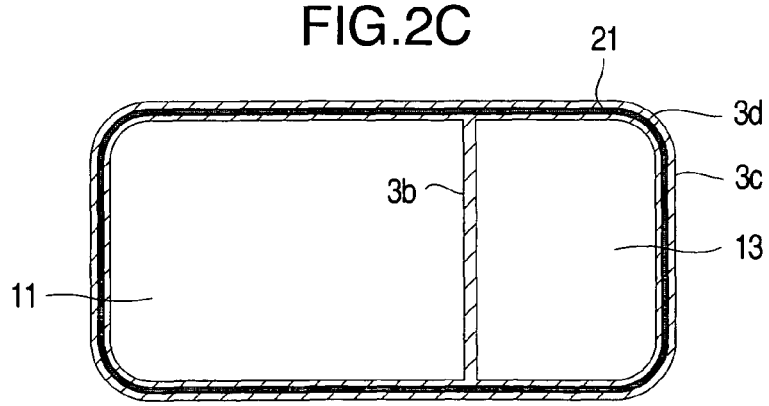

FIGS. 2A to 2C show Embodiment 2 according to the present invention. The embodiment corresponds to the first, second, and fifth aspects. FIG. 2A is a vertically sectional view, FIG. 2B is a partially enlarged sectional view of FIG. 2A, and FIG. 2C is a sectional view taken along the IIC-IIC line of FIG. 2A. It is to be noted that constituting portions identical or corresponding to those of Embodiment 1 of FIG. 1 are denoted with the same reference numerals as those of FIG. 1, and described, but the description is omitted if unnecessary.

Figure 3A:
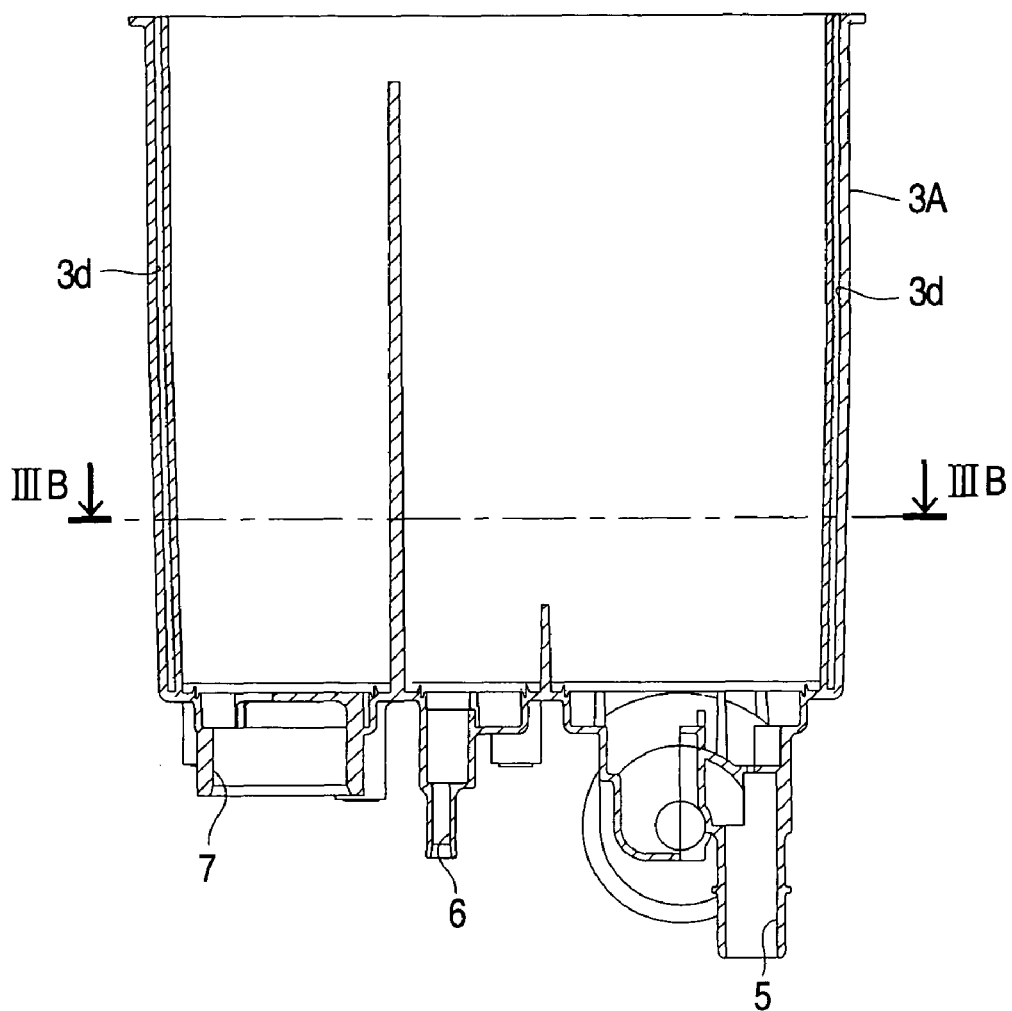
FIGS. 3A, 3B show a case of the Embodiment 2 in FIG. 2A.
Figure 3B:
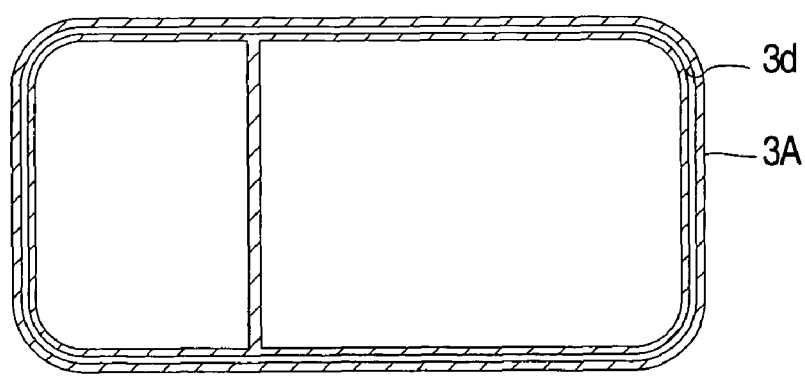

Embodiment 2 is different from the Embodiment 1 in that a case body 3A constituting a case 2 of a canister 1 is different from a case body 3 of the Embodiment 1 of FIG. 1. In the Embodiment 2, a chamber 3d is disposed in a case portion forming peripheral walls of adsorptive material chambers 11, 12, and 13 of the resin molded case body 3A made of nylon, that is, a case portion 3c excluding a partition plate 3b, and this chamber 3d is filled with a thermal storage material 21. The chamber 3d filled with the thermal storage material 21 is shown in detail in FIG. 2B. As shown in FIGS. 3A, 3B, this chamber 3d is formed by molding the case body 3A by means of gas assisting molding.

In FIGS. 3A, 3B, the case body 3A is molded by the known gas assisting molding, and nylon is used in a molding material. It is to be noted that the gas assisting molding is described in detail in "Industrial Material" issued in July, 1995 by Nikkan Kogyo Production, Vol. 43, No. 7. In this manufacturing method, a space portion as the chamber 3d is molded to be hollow in the case body 3A. As shown in FIG. 3B, this space portion (3d) is formed over the whole periphery of the case body 3A.

In this manner, the molten thermal storage material 21 is injected into the chamber 3d of the case body 3A subjected to the gas assisting molding (hollow molding) as shown in FIGS. 4A to 4C. When the temperature drops, the thermal storage material 21 solidifies. Thereafter, as shown in FIG. 4A, predetermined filter, adsorptive material and so on are contained in the case body, and as shown by arrows W in the drawing, a lid 4 is allowed to abut on an upper-end opening of the case body 3A, welded to the case by vibration welding, and sealed with it.

It is to be noted that thermal storage material microcapsules may be charged instead of injecting the molten thermal storage material into the chamber (space) 3d as shown in FIGS. 4A to 4C.

Embodiment 3

Embodiment 3 shown in FIGS. 5A to 5C is different from the Embodiment 2 shown in FIGS. 4A to 4C in that a shape of a case body 3B is slightly different from that of the case body 3A. In the Embodiment 3 of FIG. 5, as shown in FIGS. 5A, 5B, a chamber (space) 3b disposed in the case body 3B has an upper end portion in the drawing which is closed and which is not open. Therefore, after performing the gas assisting molding of the case body 3A of the Embodiment 2 shown in FIG. 3A, a thermal storage material 21 cannot be injected into a chamber (space) 3d from above in FIGS. 4A, 4B.

In the Embodiment 3, the molding of the case body 3B and the injecting of the thermal storage material into the chamber (space) 3d of the case body 3B are performed by a manufacturing method similar to so-called water assisting molding.

FIGS. 6 to 8D are explanatory views of a method of manufacturing the case body 3B in a case where the molding method similar to the known water assisting molding is performed utilizing a film gate.

Figure 6:
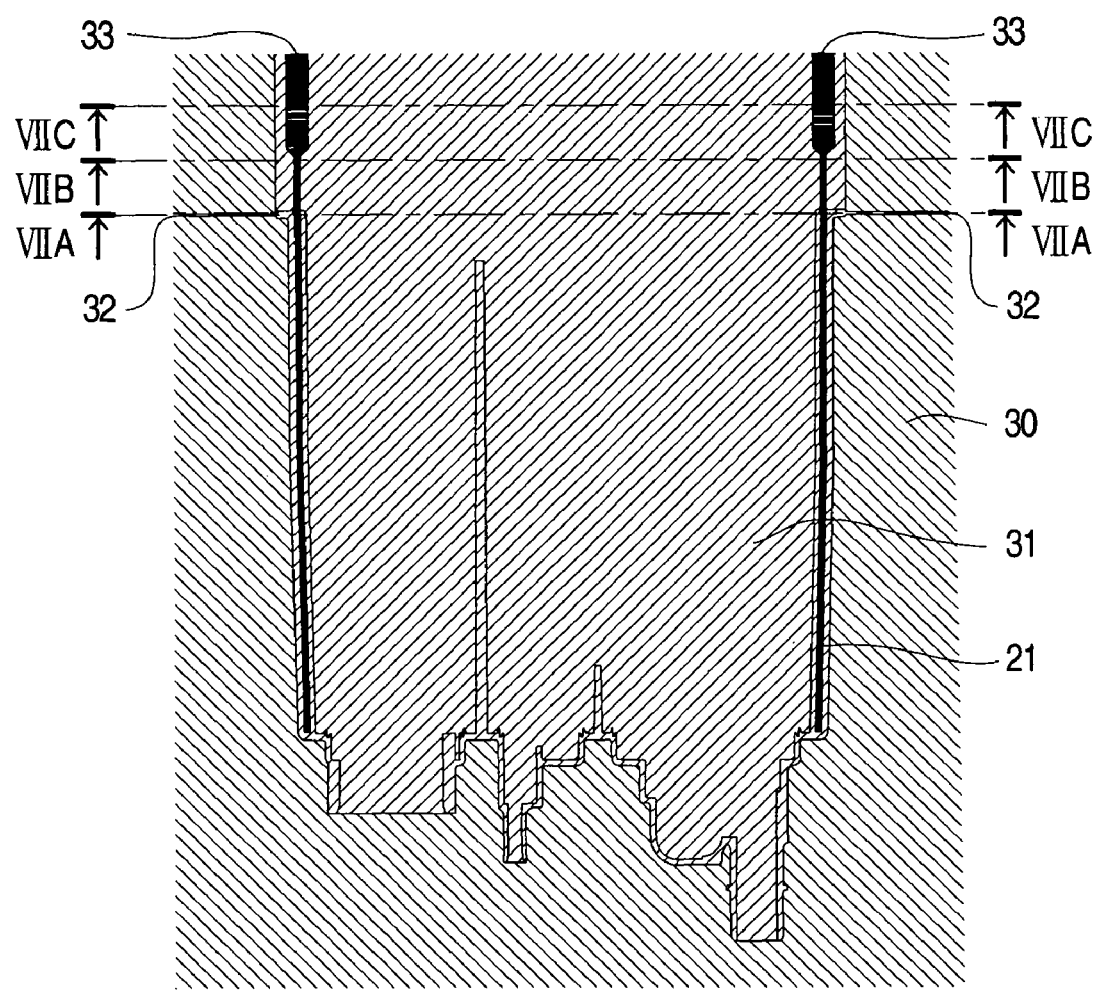
FIG. 6 is an explanatory view of a method of molding the case in the Embodiment 3 of the present invention.
Figure 7A:
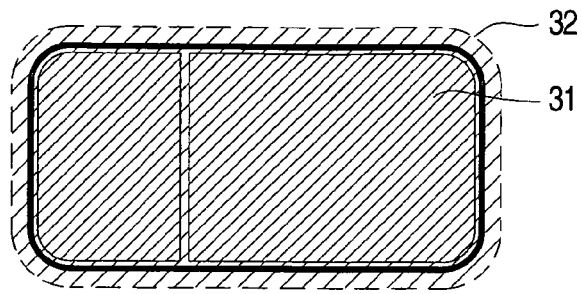
FIGS. 7A to 7C are diagrams showing the molding method.
Figure 7B:
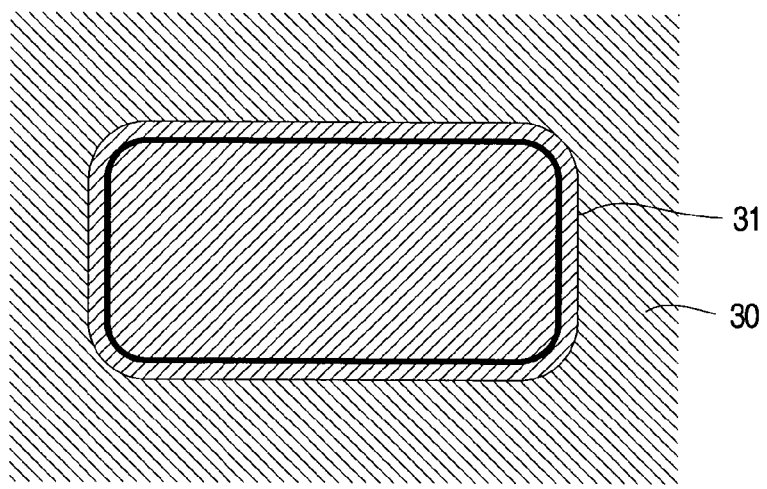
Figure 7C:
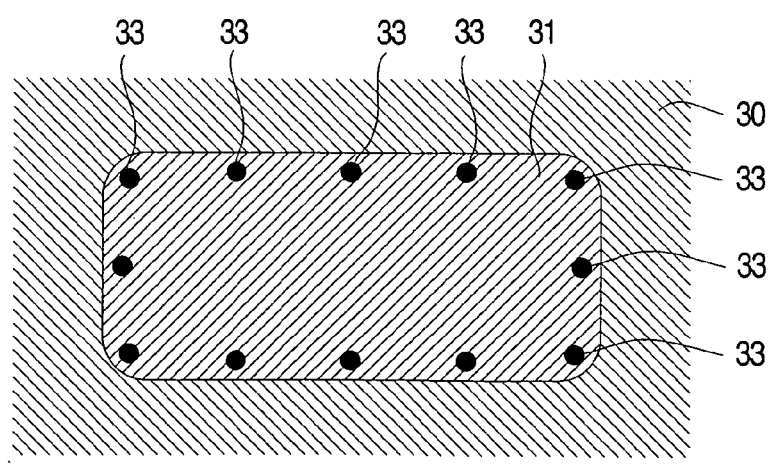

FIG. 6 is a vertically sectional view showing the use of the film gate, FIG. 7A is a sectional view taken along the VIIA-VIIA line of FIG. 6, FIG. 7B is a sectional view taken along the VIIB-VIIB line of FIG. 6, FIG. 7C is a sectional view taken along the VIIC-VIIC line of FIG. 6, and FIGS. 8A to 8D are explanatory views of confining steps of a thermal storage material in the manufacturing method utilizing the film gate shown in FIGS. 6 to 7C, and diagrams corresponding to a part of FIG. 6.

In FIGS. 6, 7A, 7B, and 7C, a movable mold 31 is movable with respect to a fixed mold 30 in a vertical direction of FIG. 6. The case body 3B is molded by use of these molds. A resin (e.g., nylon) of the case body 3B is denoted with reference numeral 32 in FIG. 6, and the resin is injected from a film gate shown by a broken line 32 which surrounds an outer periphery of the movable mold 31 in FIG. 7A. As shown in FIG. 7A, a thin film of resin is injected via this film gate from the whole periphery. Moreover, the molten thermal storage material 21 is injected from a thermal storage material injection gate introducing portion, for example, twelve pin gates 33 before the resin solidifies. In such molding method, the molten thermal storage material 21 is used instead of water in the known water assisting molding. Therefore, the molding method of the present embodiment is represented by a molding method similar to the water assisting molding.

There will be described hereinafter steps of injecting the resin of the case body and the molten thermal storage material in detail with reference to FIGS. 8A to 8D.

(1) There is injected a resin having an amount which is slightly smaller than a volume in the molds 30 and 31 from the film gate 32 into the molds (FIG. 8A).

(2) The thermal storage material 21 is injected from the pin gate 33 into the resin before the resin solidifies (FIG. 8A).

(3) An injection pressure of the thermal storage material 21 is lowered (FIG. 8B).

(4) The pressure for injecting the resin from the film gate 32 is raised again to allow the resin to flow into the molds (FIG. 8B).

(5) The gate of the thermal storage material 21 is sealed with the inflowing resin (FIG. 8C). In this step, a film gate portion 34 of the thermal storage material 21 is comparted by the resin pressure as shown by reference numeral 34a of FIG. 8C, and the thermal storage material 21 is confined in the resin material.

FIG. 8D shows that a constriction 34b is generated in the film gate portion 34 of the thermal storage material owing to a rise of the resin pressure in the above-described step (4) shown in FIG. 8B. This constriction 34b changes from the constricted state to the comparted state shown by reference numeral 34a in FIG. 8C owing to a pressure difference between the pressure of the thermal storage material 21 injected from the pin gate 33 of FIG. 8B and the pressure of the resin injected from the film gate 32.

(6) The resin is cooled and solidified in the molds, and a product (case body 3B) is removed from the molds. This step is not shown in any drawing.

Embodiment 4

Figure 9:
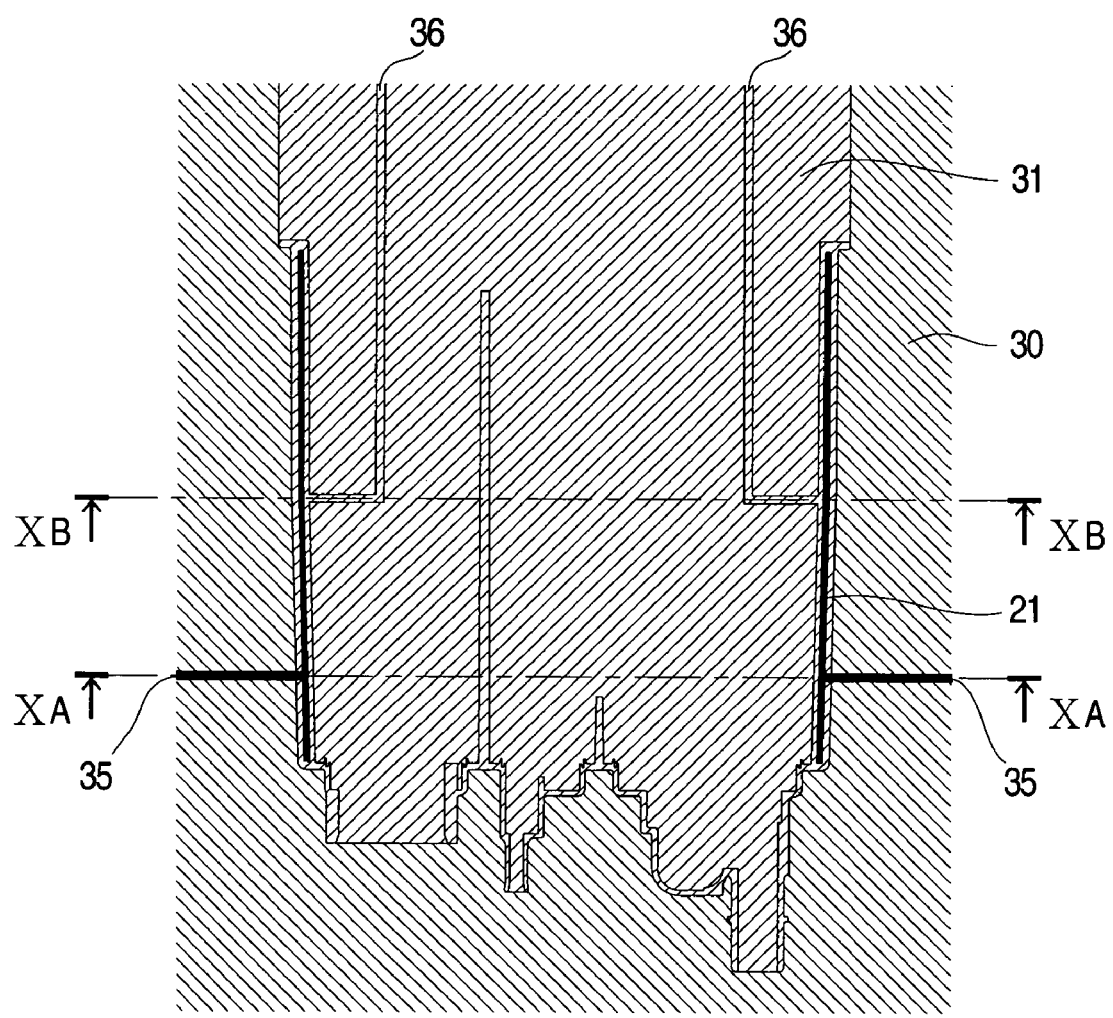
FIG. 9 is an explanatory view of a molding method in Embodiment 4 according to the present invention.
Figure 10A:
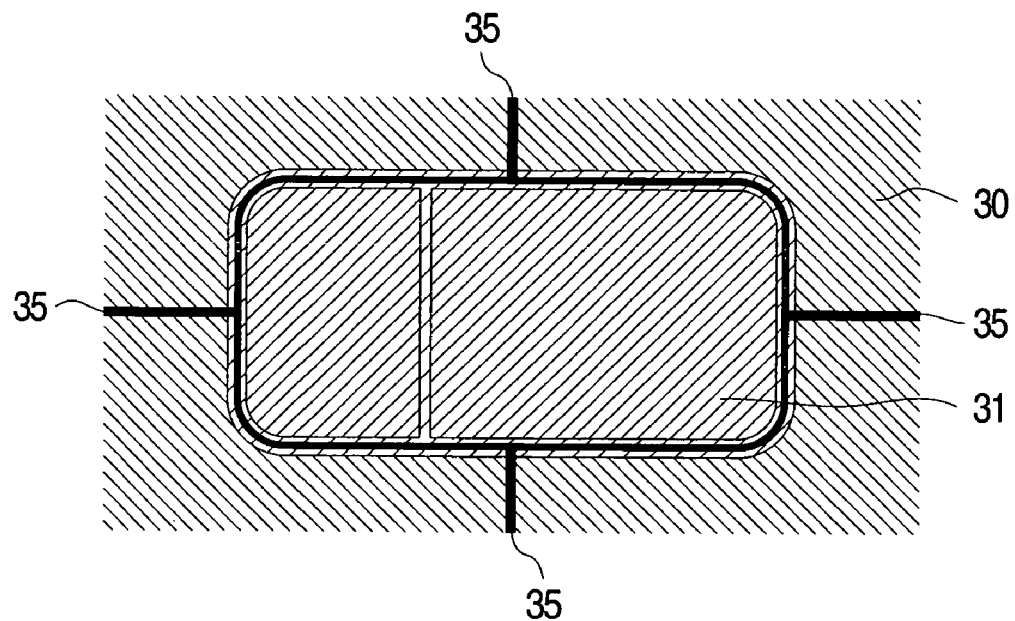
FIGS. 10A, 10B are diagrams showing the molding method.
Figure 10B:
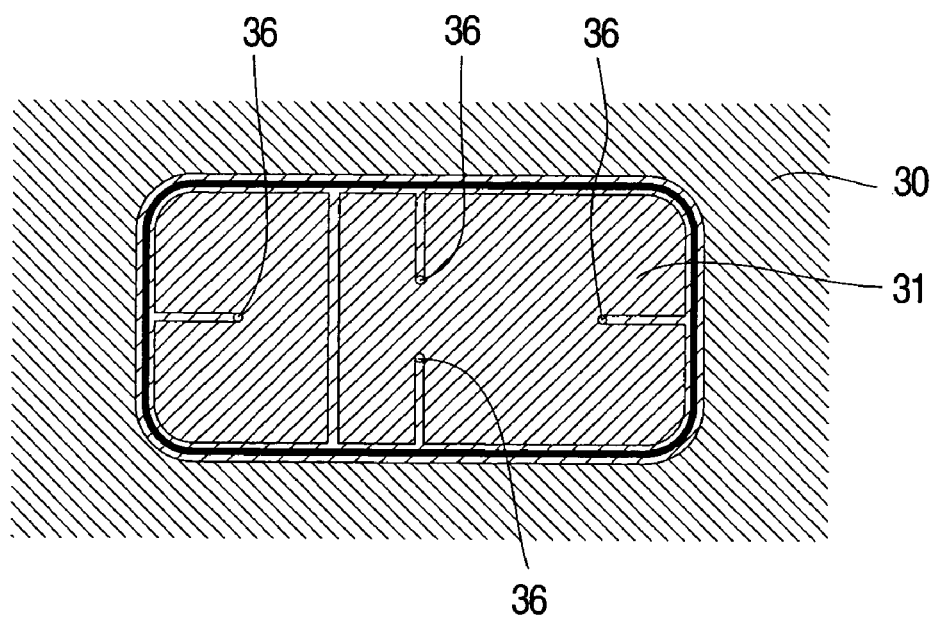

FIGS. 9 to 11D are explanatory views of a method of molding a case body 3B and a method of injecting a thermal storage material 21 in Embodiment 4, corresponding to FIGS. 6 to 8D showing the manufacturing method in the Embodiment 3. In the Embodiment 4, pin gates are all used. As shown in FIGS. 9 and 10A, a fixed mold 30 is provided with pin gates for injecting the thermal storage material, for example, four pin gates 35. A movable mold 31 is provided with pin gates such as four pin gates 36 as shown in FIGS. 9 to 10B.

Next, molding steps will be described with reference to FIGS. 11A to 11D.

Figure 11A:
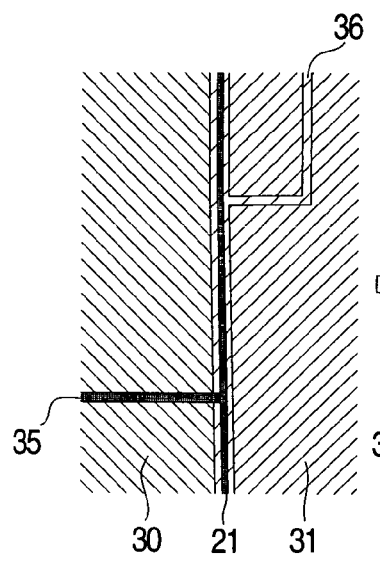
FIGS. 11A to 11D are explanatory views of a procedure (steps) of the method of molding the case in the Embodiment 4 of the present invention.

(1) There is injected a resin having an amount which is slightly smaller than a volume in the molds 30 and 31 from the pin gate 36 into the molds (FIG. 11A).

(2) The thermal storage material 21 is injected from the pin gate 35 into the resin before the resin solidifies (FIG. 11A).

Figure 11B:
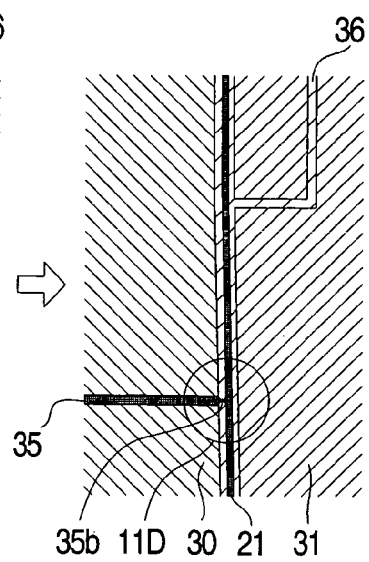

(3) An injection pressure of the thermal storage material 21 is lowered (FIG. 11B).

(4) The pressure for injecting the resin from the pin gate 36 is raised again to allow the resin to flow into the molds (FIG. 11B).

Figure 11C:
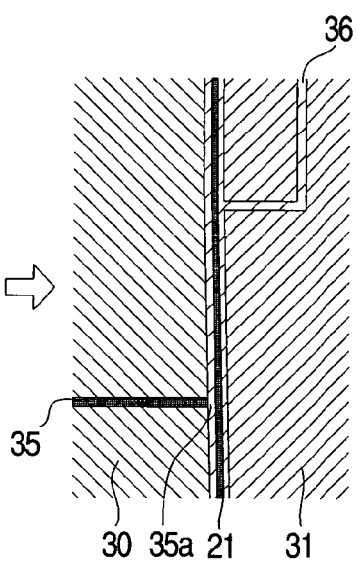

(5) A portion 35a of a pin gate portion for the thermal storage material 21 is comparted by the inflowing resin, and the thermal storage material 21 is confined in the resin, as shown in FIG. 11C.

Figure 11D:
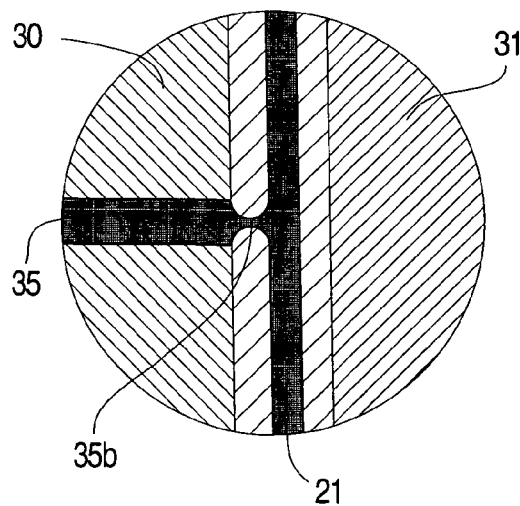

FIG. 11D shows that a constriction 35b is generated in a gate portion 35 of the thermal storage material in a part 11D of FIG. 11B owing to a rise of the resin pressure in the above-described step (4) shown in FIG. 11B. This constriction 35b changes from the constricted state to the comparted state shown by reference numeral 35a in FIG. 11C owing to a pressure difference between the pressure of the thermal storage material 21 injected from the pin gate 35 of FIG. 11B and the pressure of the resin injected from the pin gate 36.

(6) The resin is cooled and solidified in the molds, and a product (case body 3B) is removed from the molds. This step is not shown in any drawing.

In the Embodiment 4, the molten thermal storage material is also used instead of water in the known water assisting molding, as in the Embodiment 3.

Embodiment 5

Figure 12A:
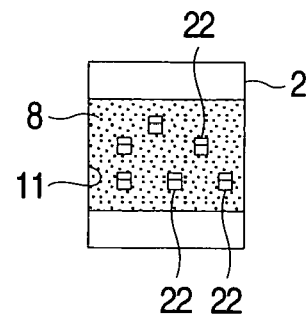
FIGS. 12A, 12B are explanatory views of Embodiment 5 according to the present invention.
Figure 12B:
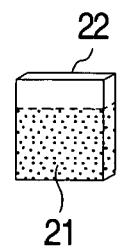

FIGS. 12A, 12B are explanatory views of Embodiment 5 according to the present invention, FIG. 12A is a schematic diagram, and FIG. 12B is an enlarged perspective view of a pellet 22 for use in FIG. 12A. In the Embodiment 5, an adsorptive material 8 such as the activated carbon is contained in an adsorptive material chamber 11 of a case 2 of a canister, and a thermal storage material or a thermal storage material microcapsule 21 is contained in a sealed container, the pellet 22, made of a material which does not pass any gasoline vapor and formed in a pellet-like shape. The pellets 22 are dispersively contained in the adsorptive material 8 of the adsorptive material chamber 11. When a metal container of copper, aluminum or the like is used as the sealed container, since the container has good thermal conductivity, it is effective.

In the Embodiment 5, the pellets 22 are dispersively contained in the adsorptive material 8, and a temperature rise or drop of the adsorptive material 8 is immediately transmitted to the thermal storage material or the thermal storage material microcapsule via the containers of the pellets 22. Therefore, it has a good thermal response, and thus, the adsorbing and purging amounts of gasoline vapor can be effectively increased, and the performance of the canister serving as an evaporated fuel treatment device is further improved.

Embodiment 6

Figure 13A:
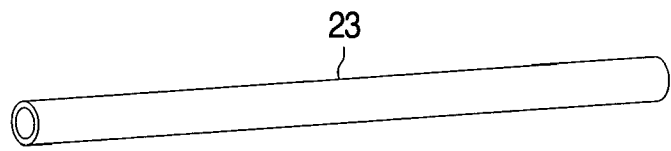
FIGS. 13A and 13B are schematic diagrams showing steps of manufacturing pellets in Embodiment 6 according to the present invention.
Figure 13B:
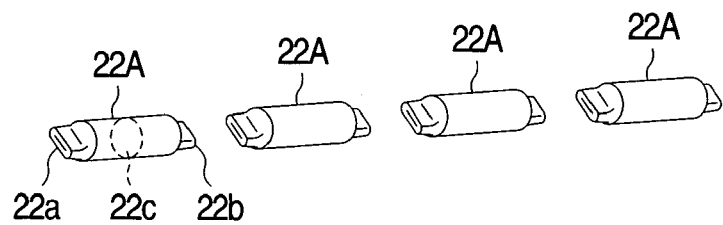

Pellets 22A similar to the pellets 22 of the Embodiment 5 are shown in FIGS. 13A, 13B of Embodiment 6. In the Embodiment 6, a thermal storage material or a thermal storage material microcapsule is charged in a metal cylinder 23 made of copper, iron, aluminum or the like, and this cylinder 23 is cut into appropriate lengths. Moreover, the cylinder portions are flatly compressed at the cut ends and sealed to form the pellets 22A. The end portions 22a and 22b of the pellets 22A are compressed and sealed as shown in the drawing. And, a hollow portion 22c of the pellet 22A has a cylindrical transverse cross section in the same manner as in the cylinder 23, and the cross section is, for example, circular. The thermal storage material or the thermal storage material microcapsule is confined in the hollow portion.

Embodiment 7

Figure 14A:
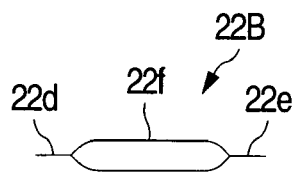
FIGS. 14A and 14B are diagrams of pellets in Embodiment 7 according to the present invention.
Figure 14B:
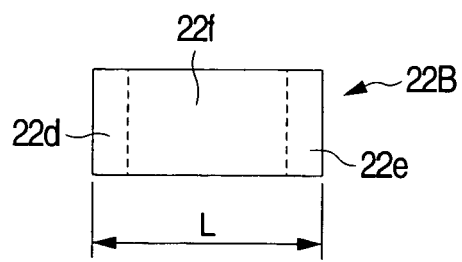

As a sealed container containing a thermal storage material or a thermal storage material microcapsule, a sheet made of a resin film on which a metal foil of aluminum or the like is laminated may constitute each pellet as shown in FIGS. 14A, 14B. In FIGS. 14A, 14B, the thermal storage material or the thermal storage material microcapsule is inserted into a bag-shaped container constituted of the above sheet, and then, the container is sealed to form a pellet 22B. The thermal storage material microcapsule having a diameter of about 2 μm is confined in a bag-shaped pellet having a length L of about several millimeters. As shown, opposite end portions 22d and 22e of each pellet are welded and sealed, and the thermal storage material or the thermal storage material microcapsule is confined in a central portion 22f. It is to be noted that the sheet constituted by laminating the metal foil constitutes the bag-shaped pellet 22B whose resin film face is internally disposed and whose metal foil is externally disposed.

It is to be noted that the structure of this pellet 22B, especially the structure of the bag-shaped sheet is formed in the same manner as that of a similarly shaped bag containing a liquid seasoning and made of the resin film laminated with the metal foil.

Embodiment 8

A capsule of a microcapsule may be made of a fluorine-based resin or a nylon-based resin in order to prevent gasoline vapor from being passed through a microcapsule film of a thermal storage material microcapsule. Alternatively, metal plating may be conducted on the surface of the capsule made of the resin or the metal is vapor-deposited on the surface, thereby preventing the gasoline vapor from passing through. The thermal storage material microcapsule has a spherical shape having a diameter of about 2 μm, and a granulated carbon having a diameter of about 2 mm and a length of about 5 mm is used as an adsorptive material made of the activated carbon. The thermal storage material microcapsule and the granulated carbon (activated carbon) are mixed with each other and contained in an adsorptive material chamber.

Embodiment 9

Since a thermal storage material microcapsule or a thermal storage material is disposed in a canister case in the Embodiments 1 to 4, a highly thermally conductive resin may be preferably used as a resin material of the case in these embodiments.

As a conventional canister case material, 66 Nylon® is generally used, and has a thermal conductivity of 0.20 W/(m·K).

A thermally conductive filling material is linked to another thermally conductive filling material via an inorganic filler to form a heat conducting path, which can obtain a thermal conductivity of the order of 30 W/(m·K), and there is developed a resin having a moldability approximately equal to that of a usual resin material (http://www.yakin.co.jp/new_mat.html, internet, investigated on Jun. 5, 2004). Therefore, when such resin is used in a case material, effects of Embodiments 1 to 4 can further be improved.

Embodiment 10

In the Embodiments 5, 6, and 7, the thermal storage materials or thermal storage material microcapsules 21 are contained in sealed containers made of material which does not pass any evaporated fuel (gasoline vapor), so as to form pellets 22, 22A, and 22B. A metal or a resin shown in Table 1 may be used as a material for use in a sealed container for containing the thermal storage material or the thermal storage material microcapsule 21. A specific heat or thermal conductivity of the metal or the resin shown in Table 1 is larger than that of a particulate activated carbon as an adsorptive material.

During adsorption of the evaporated fuel, there is a temperature rise of the activated carbon because the evaporated fuel is liquefied. An adsorbing performance tends to deteriorate. However, when the specific heat of the sealed container is large, a conducted heat amount to the sealed container is large. Therefore, the temperature rise of the activated carbon is restrained and reduced. When the sealed container has a large thermal conductivity, the conducted heat amount to the sealed container is large. Therefore, the temperature rise of the activated carbon is restrained and reduced. When purging, the function reverses to the above. When the specific heat or the thermal conductivity of the sealed container is large, a temperature drop of the activated carbon is restrained and reduced.

To solve the problem, in Embodiment 10, the sealed container is constituted of a metal such as aluminum, copper, iron or stainless steel, or a resin such as nylon, polyacetal, polyphenylene sulfide, or phenol. Accordingly, the specific heat or the thermal conductivity of the sealed container is set to be larger than that of the activated carbon as an adsorptive material. A temperature change of the adsorptive material during the adsorbing and purging of the evaporated fuel is restrained to improve performance of a canister.

TABLE 1

|  |  |  | Specific heat (J/g °C.) | Thermal conductivity (W/m °C.) |
|---|---|---|---|---|
| Adsorptive material | | Particulate activated carbon | $0.8\sim1.7 \times 10^{-3}$ | 0.065 |
| Case material | Metal | Aluminum | 0.905 | 237 |
| | | Copper | 0.386 | 398 |
| | | Iron | 0.442 | 80 |
| | | Stainless steel | 0.502 | 4 |
| | Resin | Nylon | $1.7 \times 10^{-3}$ | 0.2 |
| | | Polyacetal | $1.5 \times 10^{-3}$ | 0.2 |
| | | Polyphenylene sulfide | $1.1 \times 10^{-3}$ | 0.35 |
| | | Phenol | $1.5 \times 10^{-3}$ | 1.1 |

As shown in Table 1, the specific heat of aluminum, copper, iron, stainless steel or the like is about 200 to 1000 times that of the particulate activated carbon. The thermal conductivity is also about 60 to 6000-fold. Moreover, the specific heat of a resin such as nylon, polyacetal, polyphenylene sulfide, phenol or the like is approximately equal to that of the particulate activated carbon, and the thermal conductivity is about three to 17-fold.

Embodiment 11

When a metal such as aluminum, copper, iron, or stainless steel of Table 1 is used, both of a specific heat and a thermal conductivity are larger than those of an activated carbon. Therefore, adsorbing and purging performances of an evaporated fuel are further improved, and the performance of a canister is effectively improved. A copper material is best because the thermal conductivity is especially large.

Embodiment 12

Since a thermal conductivity of a resin such as nylon, polyacetal, polyphenylene sulfide, phenol or the like of Table 1 is larger than that of an activated carbon, a temperature change of an evaporated fuel is restrained during adsorbing and purging, and performance of a canister is effectively improved. Among the resins, nylon is optimum for improving the performance of the canister because the specific heat is largest. Additionally, nylon is easy to mold, and a material cost is low. Therefore, nylon is useful for cost reduction of the canister.

Embodiment 13

In Embodiment 13, a sealed container of a canister is constituted of a press-molded metal. As shown in FIGS. 15A, 15B, the metals are press-molded into a square dish shape, and the first and second dish-shaped molded portions 24a and 24b are allowed to abut on each other and bonded to each other in such a manner that openings of the portions face each other. A bonding portion 25 shown in FIG. 15A is welded or brazed to integrate the opposite dish-shaped portions 24a and 24b and constitute a sealed container 26. Moreover, a predetermined thermal storage material or thermal storage material microcapsule is injected into a space portion 27 defined by the opposite dish-shaped portions 24a and 24b via an opening 24c formed in one dish-shaped portion 24a, and the opening 24c is closed with a plug or the like (not shown), so as to form each pellet. The plug is forced into the opening 24c, or welded to seal the opening. This pellet is disposed in a main adsorptive material chamber or a sub-chamber (not shown) of the canister together with an activated carbon as an adsorptive material.

Embodiment 14

In Embodiment 14, a resin is first injection-molded into two divided members of a sealed container of a canister. As shown in FIGS. 16A and 16B, first and second dish-shaped portions 24d and 24e are injection-molded of the resin, and allowed to abut on and bonded to each other in such a manner that openings of the portions face each other. A bonding portion 25A shown in FIG. 16A is welded or bonded to integrate the opposite dish-shaped portions 24d and 24e and constitute a sealed container 26A. Moreover, a predetermined thermal storage material or thermal storage material microcapsule is injected into a space portion 27A defined by the opposite dish-shaped portions 24d and 24e via an opening 24f formed in one dish-shaped portion 24e, and the opening 24f is closed with a plug or the like (not shown) to form each pellet. The plug is forced into the opening 24f, or welded to seal the opening. This pellet is disposed in a main adsorptive material chamber or a sub-chamber (not shown) of the canister together with an activated carbon as an adsorptive material.

Embodiment 15

Figure 17A:
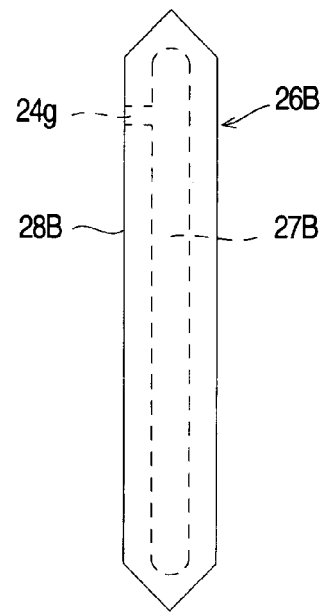
FIGS. 17A to 17C are explanatory views of Embodiment 15 according to the present invention.
Figure 17B:
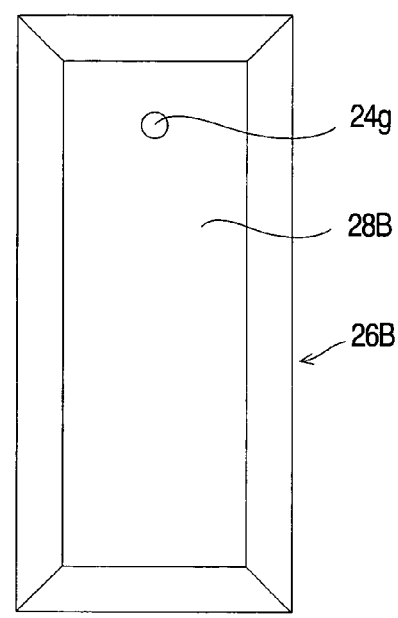

In Embodiment 15, a sealed container 26B of a canister is first molded into a shape as shown in FIGS. 17A, 17B by gas assisting molding (referred to also as gas injection or hollow injection molding), so as to form a peripheral wall 28B which surrounds a space portion 27B. Moreover, after injecting a predetermined thermal storage material or thermal storage material microcapsule into the space portion 27B via an opening (hole) 24g of the peripheral wall 28B, a plug (not shown) is forced or welded into the opening 24g to close (seal) the opening. Thus prepared pellet is disposed in a main adsorptive material chamber or sub-chamber (not shown) as an adsorptive material together with an activated carbon.

Figure 17C:
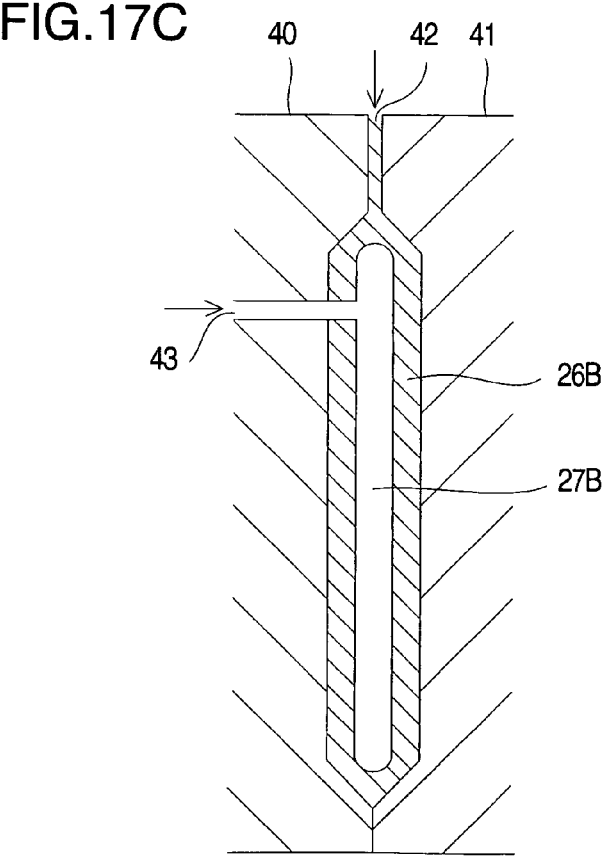

FIG. 17C is a vertically sectional view showing a manufacturing method of molding the sealed container 26B by gas assisting molding. A molten resin is injected between a first mold 40 and a second mold 41 via a resin gate 42, and a gas is injected via a gas injection port 43 to mold the hollowed sealed container 26B.

The molten thermal storage material is injected into the sealed container 26B via the opening 24g molded through the gas injection port 43. When temperature drops, the thermal storage material solidifies and hardens. The opening 24g of the sealed container 26B into which the thermal storage material is injected in the above manner is closed with a lid to form each pellet.

It is to be noted that the thermal storage material microcapsule may be injected and charged instead of the thermal storage material.

Embodiment 16

In Embodiment 16, a sealed container of a canister is manufactured by a manufacturing method similar to water assisting molding described in the Embodiment 3 with reference to FIGS. 6 to 8D.

Figure 18A:
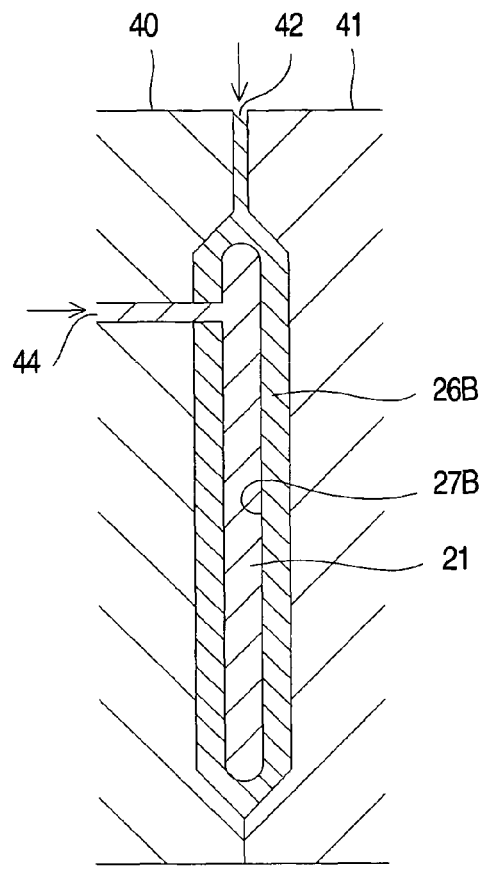
FIGS. 18A to 18C are explanatory views of a method of manufacturing the sealed container in Embodiment 16 according to the present invention.
Figure 18B:
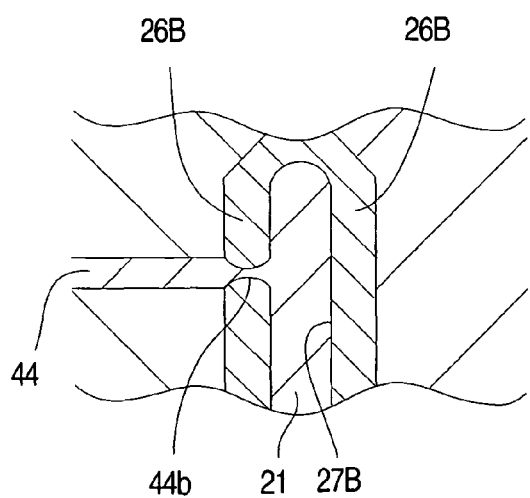
Figure 18C:
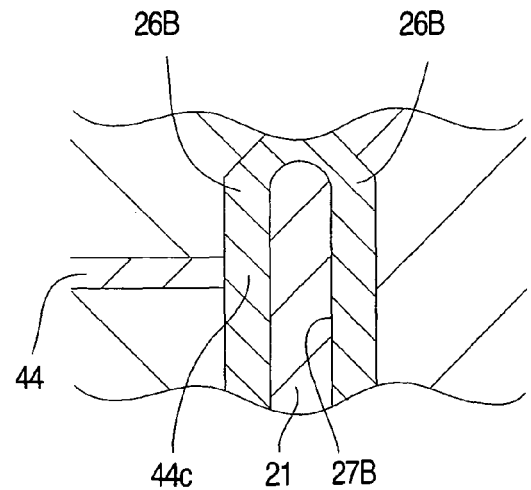

As shown in FIGS. 18A to 18C, a molten resin is injected between a first-mold 40 and a second mold 41 (into molds) via a resin material gate 42. In this case, an amount of the resin is set to an injection amount which is slightly smaller than a volume of a sealed container 26B in the molds.

Next, a thermal storage material 21 is injected from a thermal storage material gate 44 into a space portion 27B in the resin before the resin solidifies.

Next, the injection pressure of the thermal storage material 21 is lowered before the resin solidifies.

The pressure of the resin is raised again, and the resin is allowed to flow into the molds.

Then, a constriction is generated as shown by reference numeral 44b in FIG. 18B in a portion of the resin forming the sealed container 26B, that is, in a portion of the thermal storage material 21 injected from the thermal storage material gate 44. Next, this constriction is cut and the thermal storage material 21 is comparted by the resin forming the sealed container 26B, as shown by reference numeral 44c in FIG. 18C. That is, the thermal storage material gate is sealed with the inflowing resin.

As described above, the resin is cooled to solidify in the molds, and the sealed container 26B containing the thermal storage material 21 is removed from the molds 40, 41.

In the present embodiment, the gate via which the thermal storage material is injected is sealed with the resin forming the sealed container 26B during molding. Therefore, there is an advantage that a step of sealing an opening 24g with a lid such as a plug as in the Embodiment 15 of FIG. 17A is not required.

Embodiment 17

Figure 19:
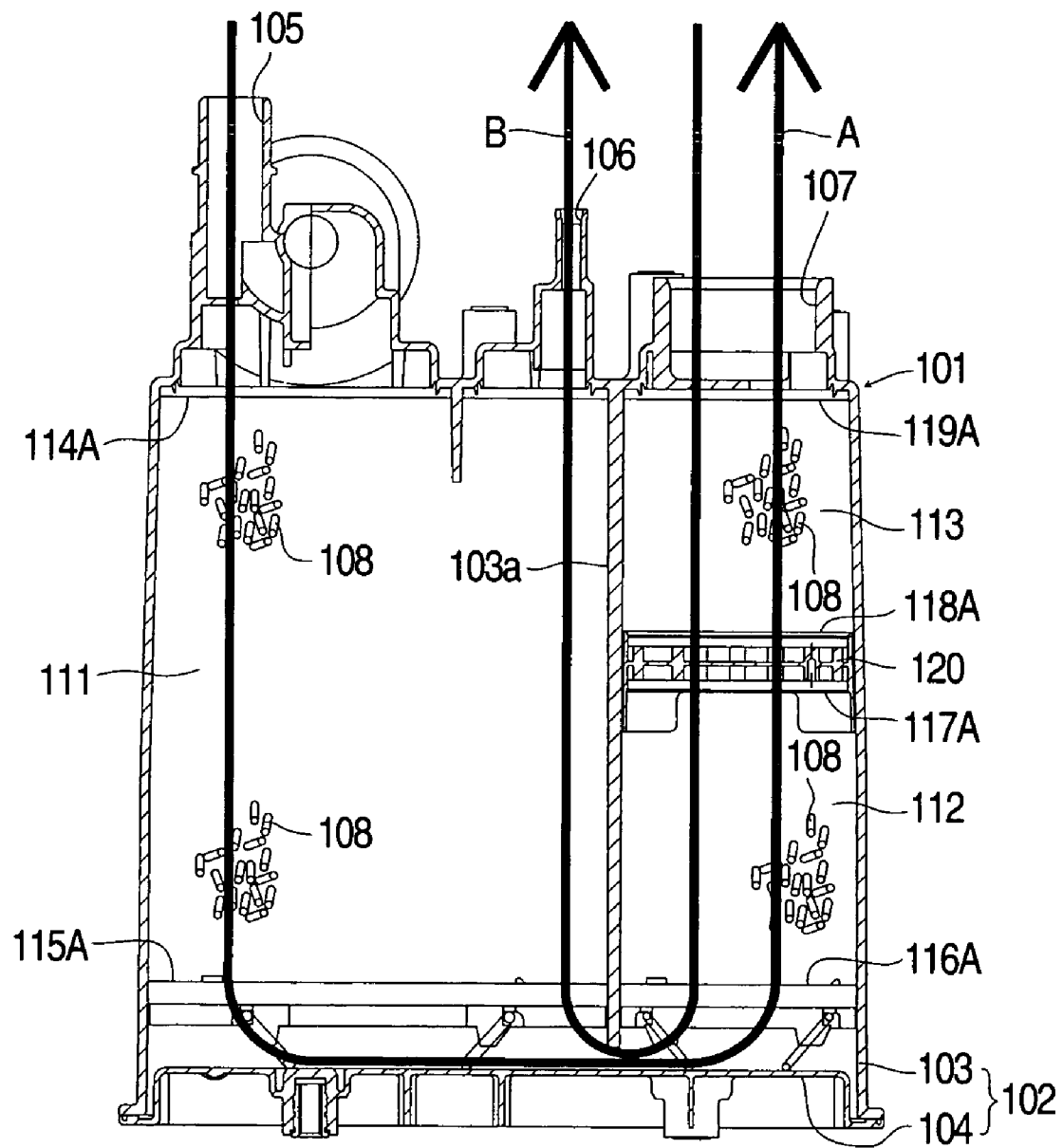
FIG. 19 is a vertically sectional view of a canister in Embodiment 17 according to the present invention.

Embodiment 17 of FIG. 19 corresponds to a canister of eighteenth and nineteenth aspects of the present invention. A case 102 of a canister 101 is constituted of: a case body 103 having an opening in a lower end thereof; and a lid 104 which seals the lower-end opening. In an upper part of the case body 103, there are formed: a tank port 105 which communicates with an upper gas chamber of a fuel tank of an automobile (not shown); a purge port 106 which similarly communicates with a suction path of the internal combustion engine; and an atmospheric port 107 opened to the atmosphere. In the case 102, a main adsorptive material chamber 111, a second adsorptive material chamber 112, and a third adsorptive material chamber 113 are arranged in order between the tank port 105 and the atmospheric port 107. The chambers contain an activated carbon which adsorbs gasoline vapor (HC) flowing from the tank port 105 to the atmospheric port 107, respectively. The second adsorptive material chamber 112 and the third adsorptive material chamber 113 constitute so-called sub-chambers. A partition plate 103a formed integrally with the case body 103 comparts the main adsorptive material chamber 111 and the second and third adsorptive material chambers 112 and 113.

The main adsorptive material chamber 111 is provided with holding filters 114A and 115A which are disposed in upper and lower parts as shown and which hold an activated carbon 108. The lower holding filter 115A is pressed onto the activated carbon 108 by a spring via a plate which abuts on the bottom of the filter. Reference numerals 116A and 117A denote holding filters which hold the activated carbon 108 contained in the second adsorptive material chamber 112, and the lower holding filter 116A is pressed onto the activated carbon 108 by a spring via a plate which abuts on the bottom of the filter. Reference numerals 118A and 119A denote holding filters which hold the activated carbon 108 contained in the third adsorptive material chamber 113. A member 120 disposed between the holding filters 117A and 118A is a vapor diffusion restraining plate (buffer plate) provided with a contraction which restrains diffusion of the gasoline vapor between the second adsorptive material chamber 112 and the third adsorptive material chamber 113.

In six holding filters 114A to 119A which hold the activated carbon 108, there is used a non-woven cloth constituted of a fiber to whose surface a thermal storage material is bonded via a resin binder. The thermal storage material is constituted by confining in a microcapsule a phase change substance whose melting point is in a range of −10 to 90° C. (preferably 10 to 45° C.) and which absorbs and discharges latent heat in response to a temperature change. As the thermal storage material, there is usable a material constituted by confining the phase change substance shown below in [Table 2] or [Table 3] in a microcapsule or the like.

TABLE 2

| Name | Melting point(° C.) |
|---|---|
| Paraffin-based | |
| Octadecane | 28.0 |
| Nonadecane | 32.0 |
| Eicosane | 36.6 |
| Heneicosane | 40.4 |
| Docosane | 44.4 |
| Tricosane | 47.4 |
| Tetracosane | 51.1 |
| Pentacosane | 53.3 |
| Hexacosane | 57.0 |
| Heptacosane | 60.0 |
| Octacosane | 61.6 |
| Nonacosane | 64.1 |
| Triacontane | 66.0 |
| Hentriacontane | 68.4 |
| Dotriacontane | 70.2 |
| Tritriacontane | 71.6 |
| Pentatriacontane | 74.6 |
| Inorganic hydrated salt | |
| Calcium chloride hydrate | 29.7 |
| Sodium sulfate hydrate | 32.4 |
| Sodium thiosulfate hydrate | 48.0 |
| Sodium acetate hydrate | 58.0 |

TABLE 3

| Name | Melting point(° C.) |
|---|---|
| Paraffin-based | |
| Dodecane | −9.65 |
| Tridecane | −6.00 |
| Tetradecane | −5.50 |
| Pentadecane | 10.00 |
| Hexadecane (cetane) | 18.15 |
| Heptadecane | 22.00 |

It is to be noted that each of the substances shown in [Table 2] and [Table 3] may not be used as a single substance. A melting-point adjuster may be added to the substance in order to obtain a phase change temperature suitable for use, or an overcooling preventive agent, a phase separation preventive agent or the like may be added to the substance in order to improve durability. The resultant mixture may be filled and introduced into a capsule container or a microcapsule made of a synthetic resin, and then used as a latent-heat storage material.

In the present embodiment of FIG. 19, when the fuel is supplied to a fuel tank, and gasoline vapor flows from the tank port 105 into the main adsorptive material chamber 111 or the like, the activated carbon 108 of the adsorptive material chamber adsorbs the gasoline vapor, and the temperature rises. When the temperature of the activated carbon 108 rises to a temperature that is not less than the phase change temperature (melting point) of the phase change substance of the thermal storage material of the holding filter brought into contact with the activated carbon, for example, the holding filter 114A, the phase change substance melts to absorb heat, and restrains a temperature rise of the activated carbon 108. Therefore, an adsorbing amount increases, and leakage of the gasoline vapor to the atmosphere is restrained.

Moreover, when the temperature of the activated carbon drops to a temperature that is not more than a function temperature of the thermal storage material of the holding filter holding the activated carbon during the purging, the latent heat accompanying a phase change (solidification) of the phase change substance in the thermal storage material restrains further temperature drop of the activated carbon. Therefore, a purging amount increases, and performance of the canister is improved.

It is to be noted that in the Embodiment 17 of FIG. 19, an arrow A shows a flow of the gasoline vapor or air which flows from the tank port 105 into the canister 101 and to flow into the atmospheric port 107 during the supplying of fuel to the fuel tank. An arrow B shows a flow during the purging in the operation of an engine.

Embodiment 18

Figure 20:
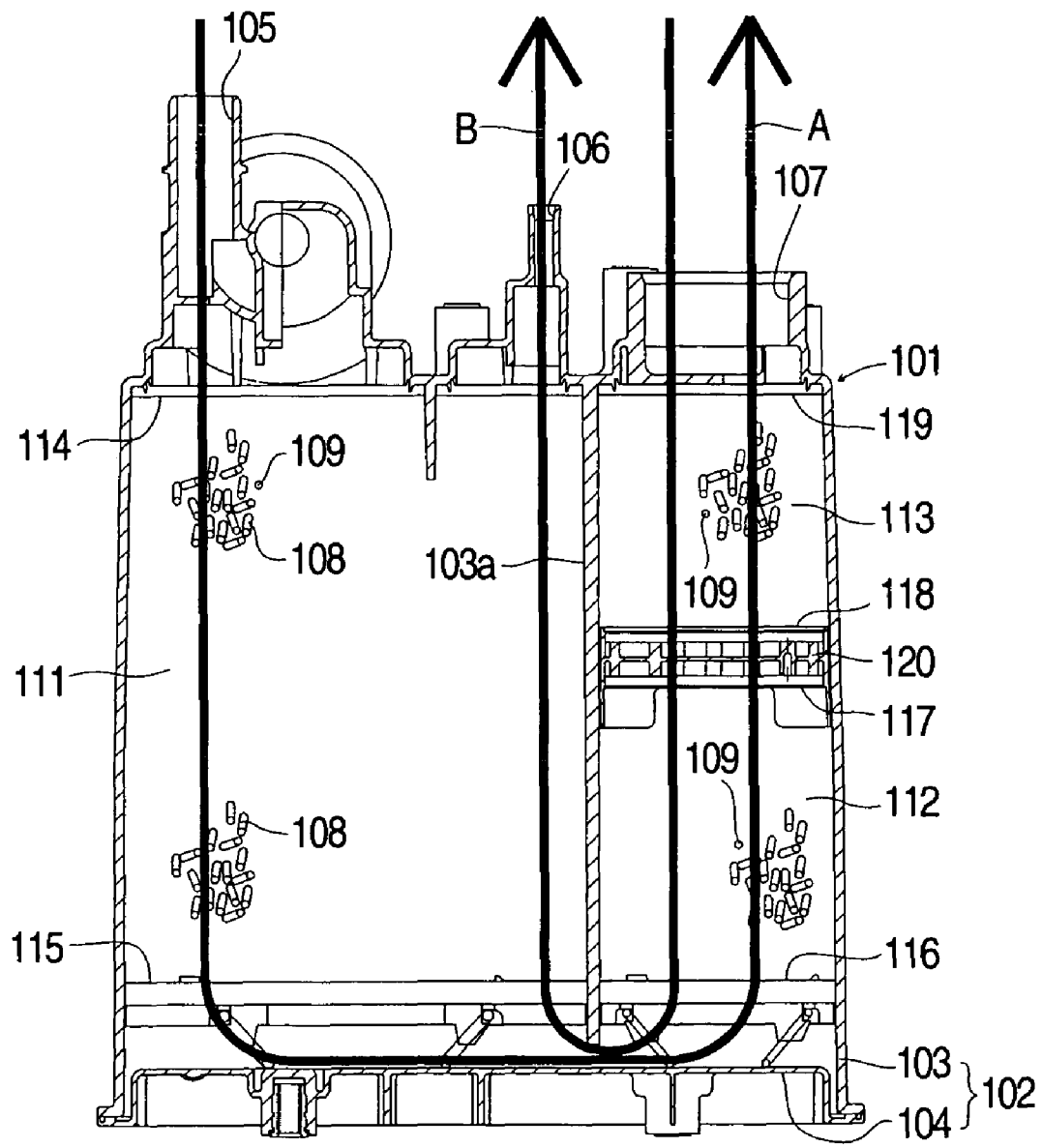
FIG. 20 is a vertically sectional view of a canister in Embodiment 18 according to the present invention.

FIG. 20 shows a vertically sectional view of Embodiment 18 of the present invention. It is to be noted that in the following descriptions including those of embodiments of FIG. 21A and the subsequent drawings, constituting portions identical or corresponding to those of the canister of FIG. 19 are denoted with the same reference numerals as those of the Embodiment 17 of FIG. 19, and duplicate description is omitted if possible.

Each of holding filters 114 to 119 for use in Embodiment 18 of FIG. 20 is constituted of a non-woven cloth using a fiber (which does not have any thermal storage material) similar to that of a conventional art. Moreover, each of adsorptive material chambers 111, 112, and 113 contains activated carbon 108, and thermal storage material which is constituted of a microcapsule containing a phase change substance and which is dispersedly mixed in the activated carbon 108. It is to be noted that since a thermal storage material 109 is very small as compared with granulated carbon as the activated carbon 108, it is difficult to draw the material. Therefore, in FIG. 20, the thermal storage material 109 is represented by one enlarged spherical shape (round) in each of the adsorptive material chambers 111, 112, and 113.

A phase change temperature (melting point) of the phase change substance constituting the thermal storage material 109 is in a range of −10 to 90° C. (preferably 10 to 45° C.), and the thermal storage material functions as a latent-heat storage material, so as to restrain a temperature rise or drop of the activated carbon during adsorbing or purging of gasoline vapor and to increase an adsorbing or purging amount. Therefore, performance of a canister is improved.

It is to be noted that in FIG. 20, the thermal storage material 109 constituted of a microcapsule containing a phase change substance is dispersedly mixed with the activated carbon 108, and the mixture is contained in each of the adsorptive material chambers 111, 112, and 113. However, the thermal storage material or the thermal storage material microcapsule may be contained in the sealed container shown in each of the Embodiment 5 shown in FIGS. 12A, 12B to the Embodiment 7 shown in FIGS. 14A, 14B, the Embodiment 8, and the Embodiment 13 shown in FIGS. 15A, 15B to the Embodiment 16 shown in FIGS. 18A, 18B, and 18C and the like, or the sealed container using the material described in each of the Embodiments 11 and 12. This sealed container may be dispersedly mixed with the activated carbon 108, and the mixture is contained in each of the adsorptive material chambers 111, 112, and 113 so that heat can be conducted between the container and the activated carbon.

Moreover, even in the canister of the first aspect, the thermal storage material may be constituted by confining, in a capsule, a sealed container, or a case body, the phase change substance whose melting point is in a range of −10 to 90° C. and which absorbs and discharges the latent heat in response to the temperature change as in the present embodiment, and the thermal storage material may be disposed in a state in which heat can be conducted between the thermal storage material and the activated carbon.

Embodiment 19

Figure 21A:
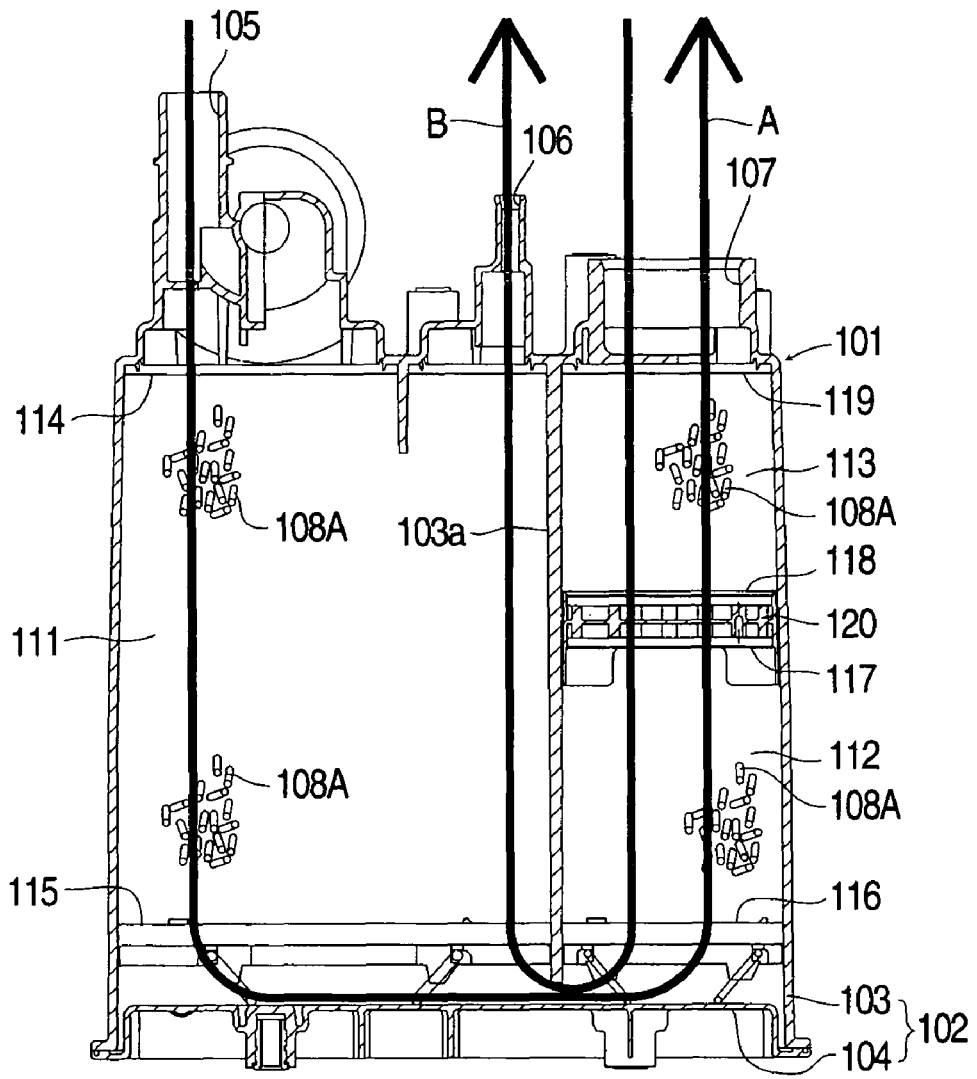
FIGS. 21A, 21B show Embodiment 19 according to the present invention.
Figure 21B:
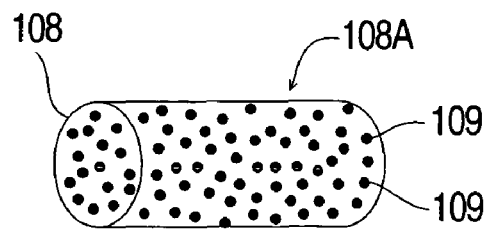

FIGS. 21A, 21B show Embodiment 19 according to the present invention, FIG. 21A is a vertically sectional view of a canister, and FIG. 21B is an enlarged perspective view of an activated carbon as an adsorptive material.

In the present embodiment, the activated carbon as an adsorptive material contained in each of adsorptive material chambers 111, 112, and 113 is a granulated carbon having a diameter of 1 to 4 mm and a length of 1 to 5 mm or a crushed carbon having a particle diameter of 0.2 to 3 mm, and thermal storage materials 109 constituted by confining a phase change substance in a microcapsule, and having a small particle diameter are coated and bonded to a longitudinal face of the carbon. This is shown by reference numeral 108A. In Embodiment 19, a function temperature of the thermal storage material, that is, a phase change temperature of the phase change substance is set in the same manner as that in the Embodiment 18.

Embodiment 20

Figure 22A:
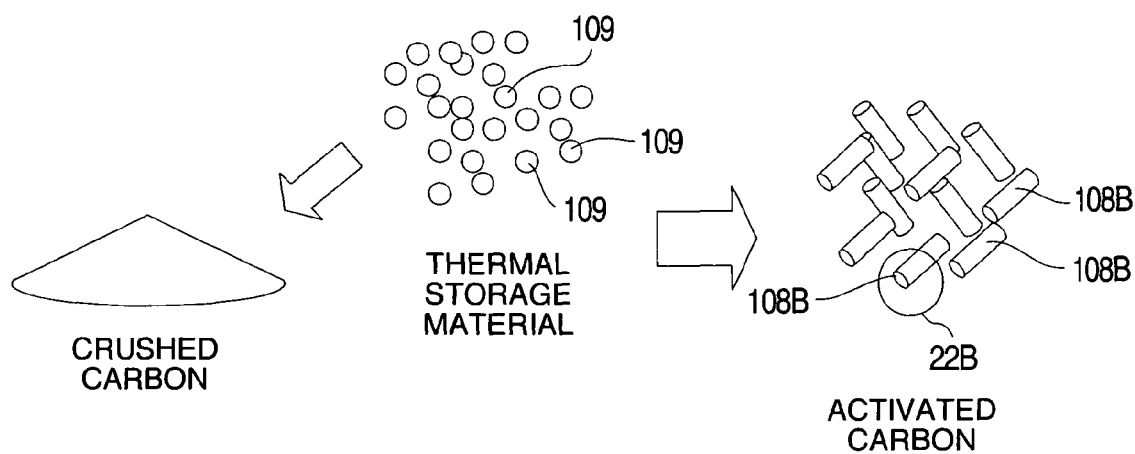
FIGS. 22A, 22B are explanatory views of activated carbons for use in a canister in Embodiment 20 according to the present invention.

As an activated carbon to be contained in an adsorptive material chamber, a pellet-shaped activated carbon is usable which is constituted by kneading a thermal storage material into a crushed carbon to mold the activated carbon. The Embodiment 20 is different from the Embodiment 19 of FIGS. 21A, 21B only in that the activated carbon constituted by kneading the thermal storage material therein to mold the pellet-shaped activated carbon is used instead of the activated carbon 108A to whose surface the thermal storage material 109 is coated and bonded. FIG. 22A is a schematic diagram showing a method of manufacturing the pellet-shaped activated carbon for use in the Embodiment 20.

Figure 22B:
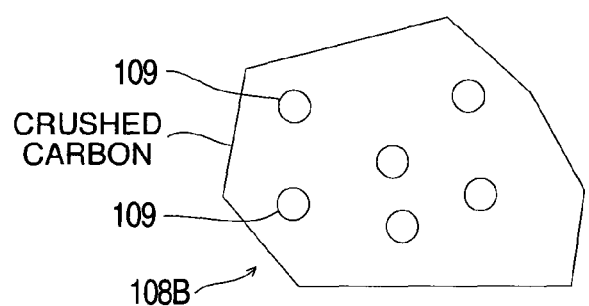

A spherical thermal storage material 109 having a small particle diameter is kneaded into a crushed carbon, and the mixture is molded into a pellet-shape to form an activated carbon (granulated carbon) 108B. FIG. 22B shows a partially enlarged sectional view of a pellet-shaped activated carbon 108B, and there is seen a behavior that the thermal storage material is dispersedly kneaded in the crushed carbon.

In the present embodiment, since a drawing of the whole canister is substantially the same as that of FIG. 21A, the drawing is omitted. Instead of the activated carbon 108A coated with the thermal storage materials 109 in FIG. 21B, there is used the pellet-shaped activated carbon 108B which is kneaded with thermal storage materials 109.

Embodiment 21

Figure 23:
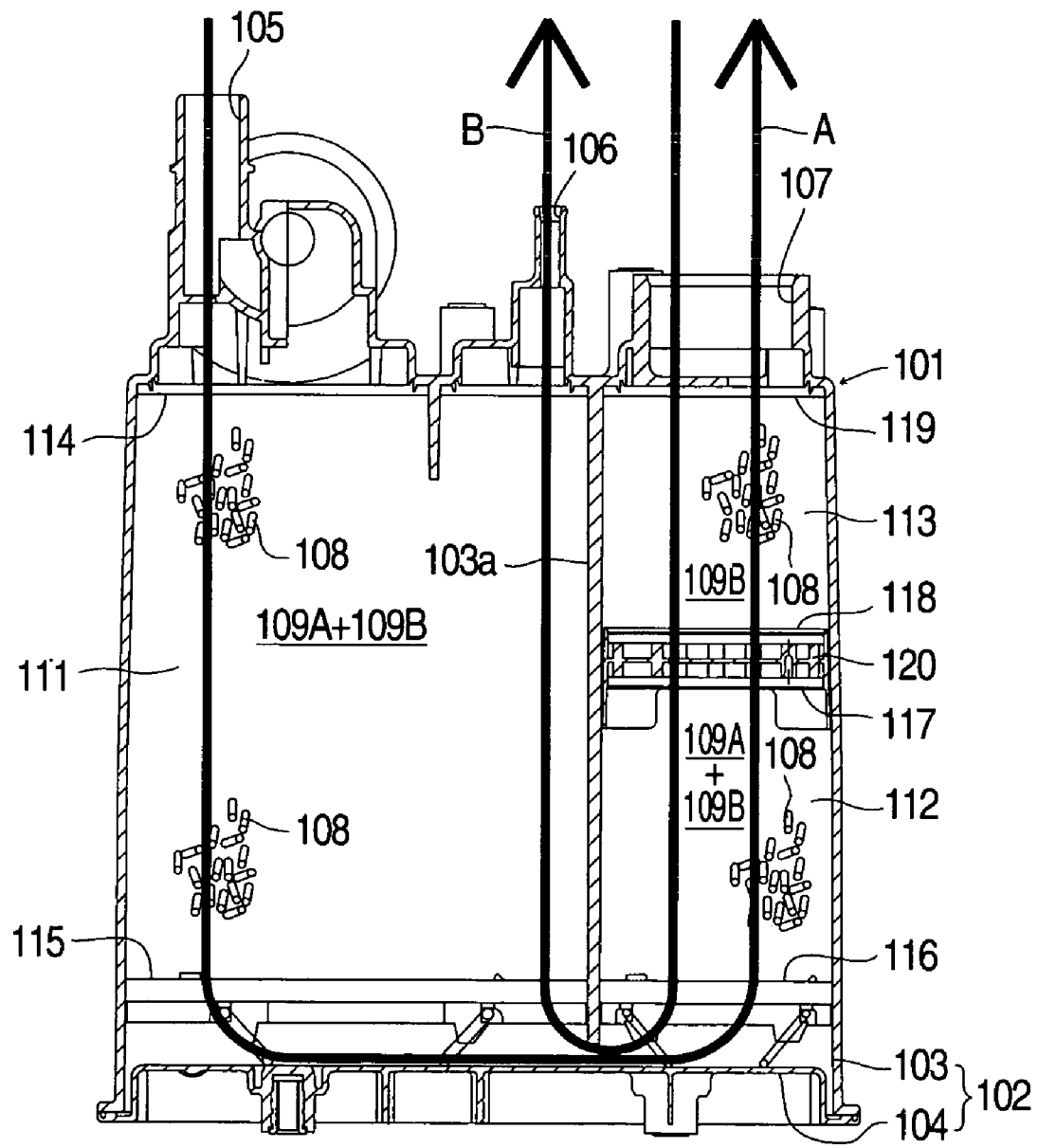
FIG. 23 is a vertically sectional view of a canister in Embodiment 21 according to the present invention.

In Embodiment 21 according to the present invention shown in FIG. 23, there are used two types of latent-heat-using thermal storage materials having different phase change temperatures, that is, melting points of phase change substances. An adsorptive material chamber in which each thermal storage material is allowed to function is selectively used in accordance with a law regulation on a vehicle and the like. Accordingly, adaptability of performance of a canister can be flexible. When the phase change temperatures, that is, the melting points of the phase change substances differ, a function temperature of the thermal storage material using one phase change substance is also different from that of the material using another phase change substance depending on the melting point. Therefore, the phase change temperature (melting point) of the phase change substance and the function temperature of the thermal storage material are used in the same sense.

In the present embodiment, as in the Embodiment 17, the phase change temperature (melting point) is in a range of −10 to 90° C. (preferably 10 to 45° C.). In this range, there are used a first thermal storage material 109A having a phase change temperature of 25° C. or more, that is, 25° C. or more and 90° C. or less (preferably 25 to 45° C.) and/or a second thermal storage material 109B having a phase change temperature which is less than 25° C., that is, −10° C. or more and less than 25° C. (preferably 10° C. or more and less than 25° C.).

Moreover, a volume of a third adsorptive material chamber 113 is set to be 2 to 15% of the whole volume which is a total of volumes of three adsorptive material chambers 111, 112, and 113, and the first thermal storage material 109A is not allowed to function (is not contained) in this adsorptive material chamber 113. Moreover, the first thermal storage material 109A is contained in another portion, that is, in the adsorptive material chambers 111 and 112. This prevents an increase of blow-by of gasoline vapor, and it is possible to increase a gasoline vapor adsorbed amount during fuel supply. This copes with the U.S. regulation ORVR in which the gasoline vapor in a fuel tank is recovered in a canister during fuel supply to a vehicle in order to prevent the vapor from being discharged to the atmosphere.

Moreover, the second thermal storage material 109B is disposed and allowed to function in all of adsorptive material chambers, that is, all of a main adsorptive material chamber 111 and second and third adsorptive material chambers 112 and 113. This increases a purging amount. Therefore, a remaining amount of gasoline vapor decreases in the third adsorptive material chamber 113 near the atmospheric port 107. This satisfies the U.S. regulation DBL of the gasoline vapor (HC) discharged to the atmosphere from the vehicle left to stand. That is, the DBL performance becomes superior. Eventually, the vapor is not easily adsorbed near an atmospheric port, and only purging property is improved. Therefore, the remaining amount of vapor decreases in the third adsorptive material chamber 113 near the atmospheric port 117, and the DBL performance becomes superior.

Figure 24A:
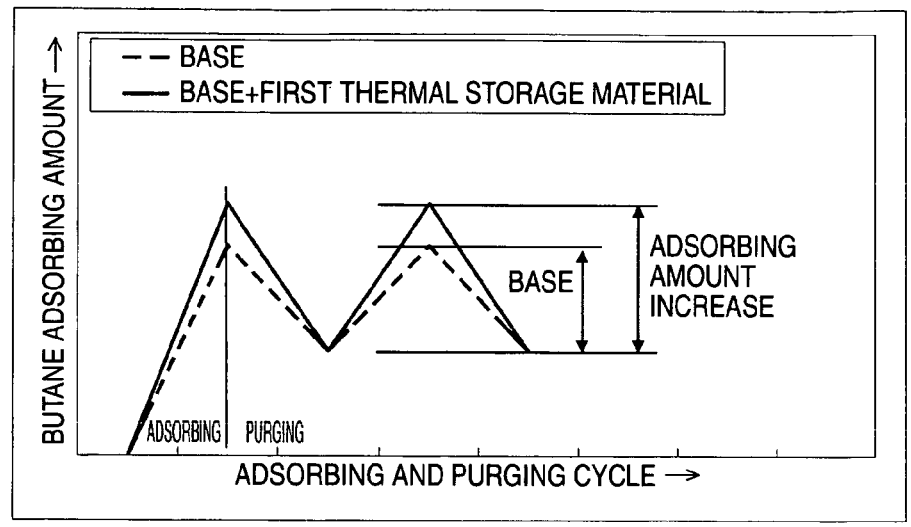
FIGS. 24A to 24C are explanatory views of adsorbing and purging amounts at a time when the canister is tested in adsorbing and purging cycles.
Figure 24B:
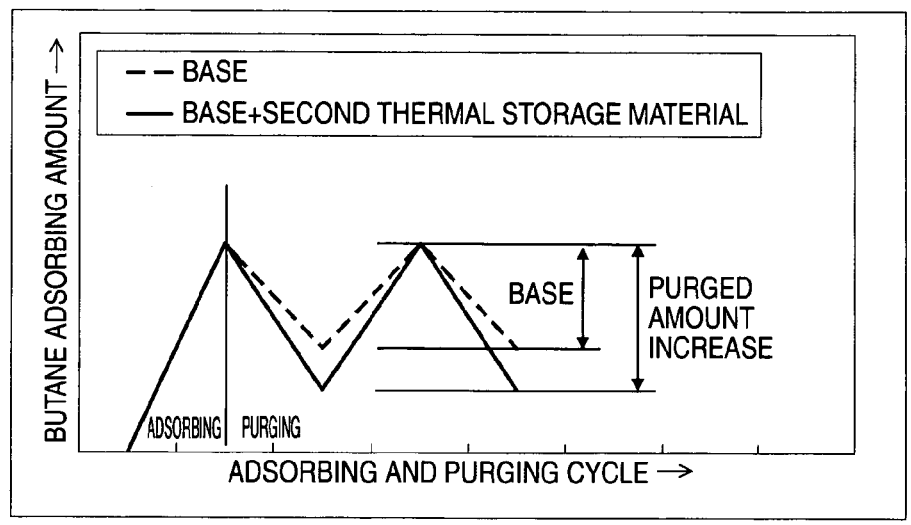
Figure 24C:
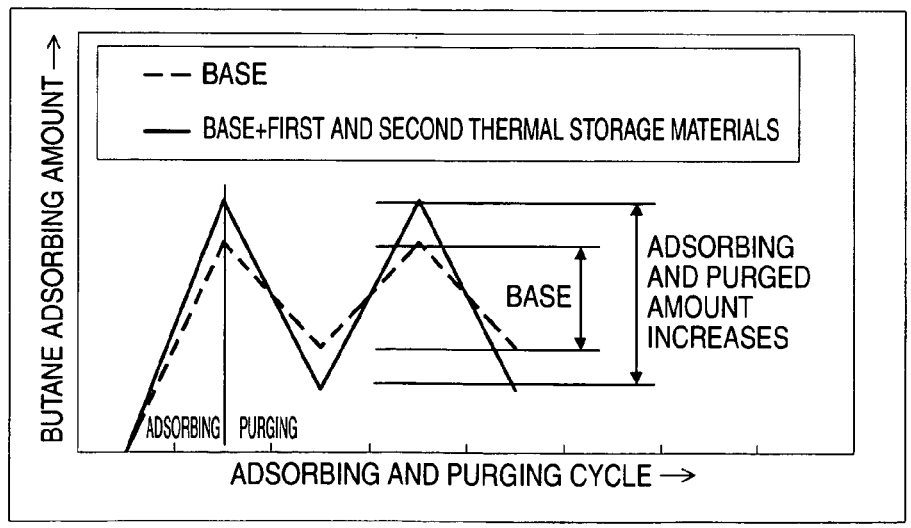

Next, there will be described a butane adsorbed amount at a time when adsorbing and purging cycles are repeated with reference to FIGS. 24A to 24C. FIGS. 24A to 24C show two adsorbing and purging cycles along the abscissa and the butane adsorbed amount along the ordinate. It is to be noted that in these drawings, broken lines are bases shown as comparative examples of data of a conventional art in which any thermal storage material is not used.

In FIG. 24A, when the first thermal storage material 109A is added to the base of the comparative example, as shown by a solid line, the adsorbed amount increases as compared with the base shown by the broken line. In FIG. 24B, when the second thermal storage material 109B is added to the base of the comparative example, as shown by a solid line, the purged amount increases as compared with the base shown by the broken line. Furthermore, in FIG. 24C, when the first and second thermal storage materials 109A and 109B are added to the base of the comparative example, as shown by a solid line, an adsorbed/purged amount increases as compared with the base shown by the broken line, and canister performance is apparently improved. In any of these tests, the adsorbing and purging are repeated in two cycles. In the test of FIG. 24A, a mechanism works in which HC adsorption→the activated carbon generates heat→a phase change substance in the first thermal storage material melts to absorb latent heat→the adsorbed amount increases. In the test of FIG. 24B, a mechanism works in which HC purging→the activated carbon temperature drops→a phase change substance in the second thermal storage material 109B solidifies to discharge the latent heat→the purged amount increases. In the test of FIG. 24C, the mechanisms in the test of both of FIGS. 24A and 24B work.

It is to be noted that when the first thermal storage material 109A is allowed to function, the adsorbed amount increases, and ORVR (On-board Refueling Vapor Recovery) performance is improved. Therefore, the present embodiment is effective for a vehicle in which a fuel tank has a complicated shape or in which the fuel tank has a large volume, and a large amount of evaporated fuel is generated from the tank.

Embodiment 22

Figure 25:
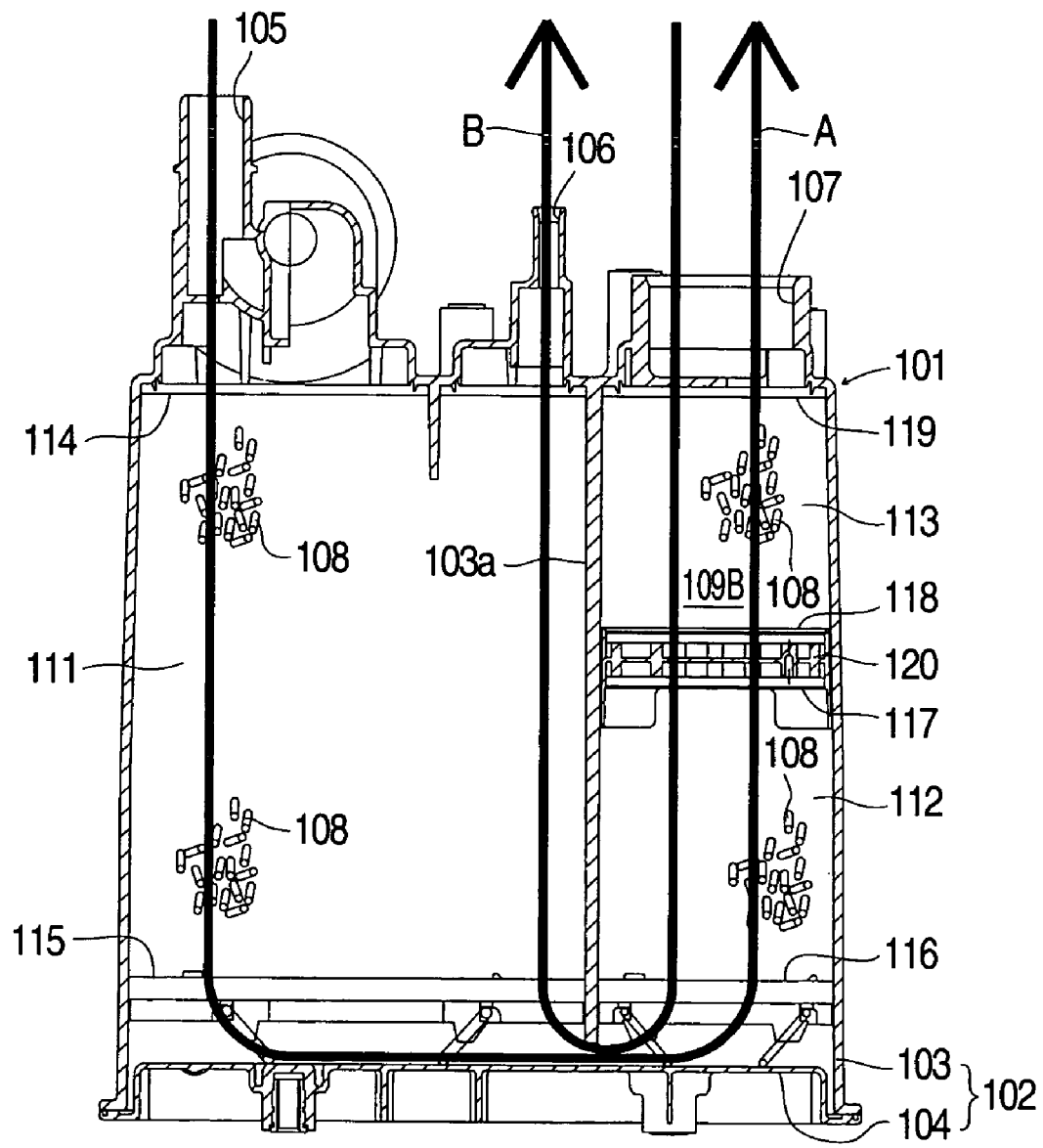
FIG. 25 is a vertically sectional view of a canister in Embodiment 22 according to the present invention.

As shown in FIG. 25, an only second thermal storage material 109B is contained in a third adsorptive material chamber close to an atmospheric port 107, and it is possible to improve only performance that copes with the U.S. DBL regulation. This is referred to as Embodiment 22. This can reduce a use amount of a thermal storage material, and the performance can be inexpensively improved. Such embodiment is preferable for an automobile provided with an engine having a small purge amount and having a small displacement, or a hybrid vehicle.

Embodiment 23

Figure 26:
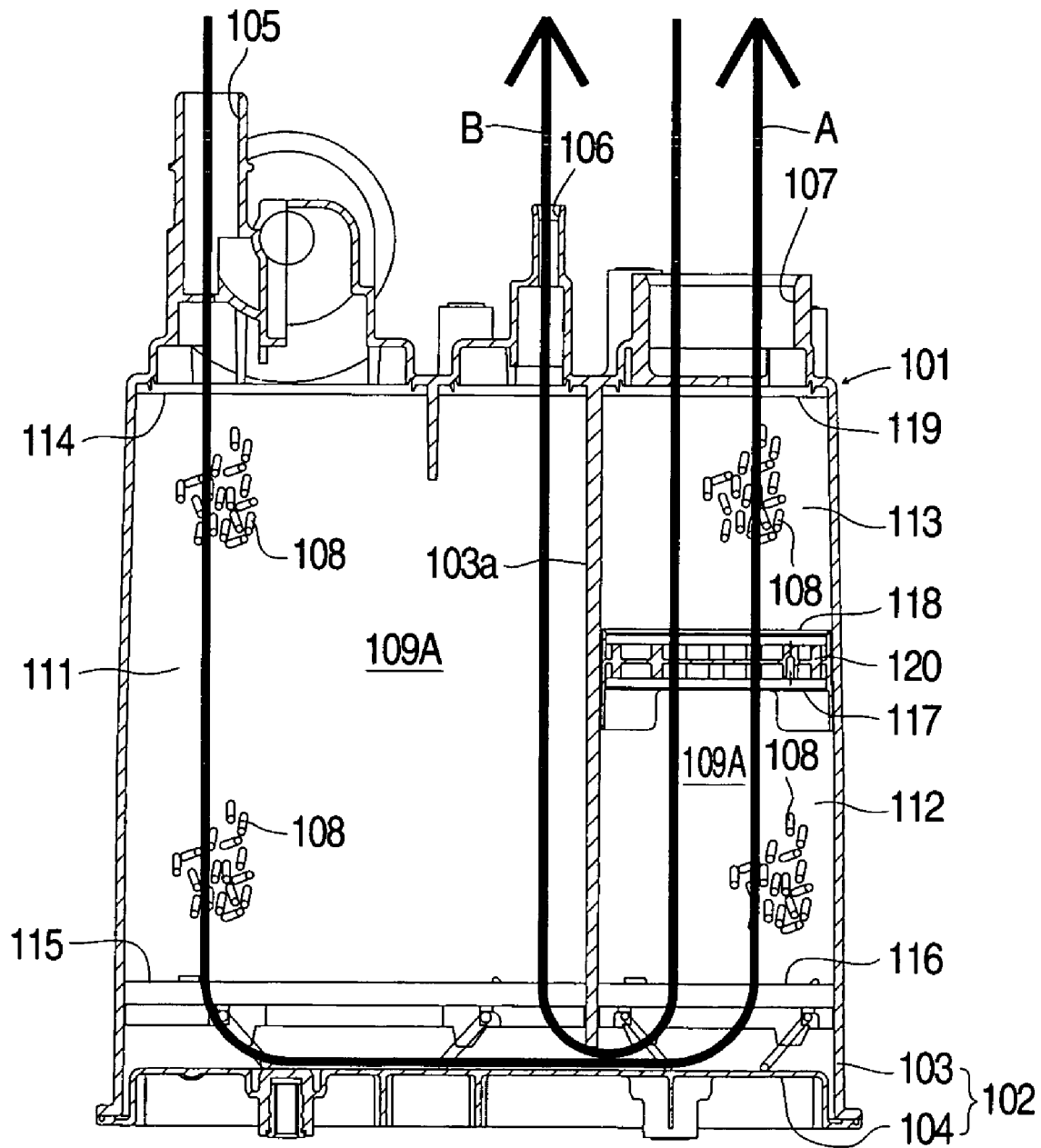
FIG. 26 is a vertically sectional view of a canister in Embodiment 23 according to the present invention.

As shown in FIG. 26, a first thermal storage material 109A is disposed and allowed to function in a main adsorptive material chamber 111 and a second adsorptive material chamber 112, and the thermal storage material may not be allowed to function in a third adsorptive material chamber 113. This Embodiment 23 is suitable for a vehicle having a large amount of gasoline vapor from a fuel tank.

Embodiment 24

Figure 27:
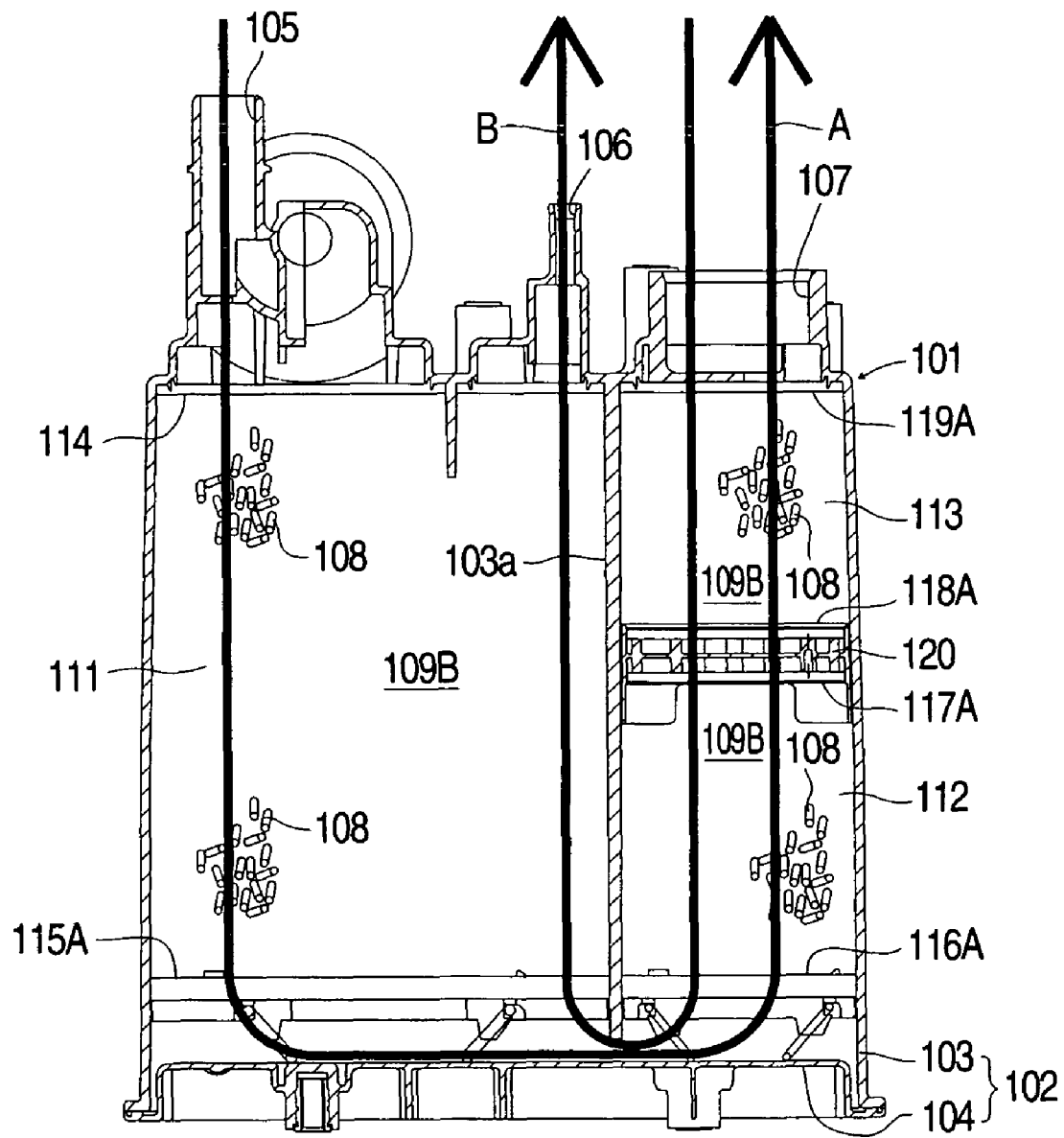
FIG. 27 is a vertically sectional view of a canister in Embodiment 24 according to the present invention.

In the present embodiment, as shown in FIG. 27, second thermal storage materials 109B are disposed and allowed to function in all of adsorptive material chambers. This Embodiment 24 is suitable for a vehicle having a small purged amount in the same manner as in the Embodiment 22.

Embodiment 25

Figure 28A:
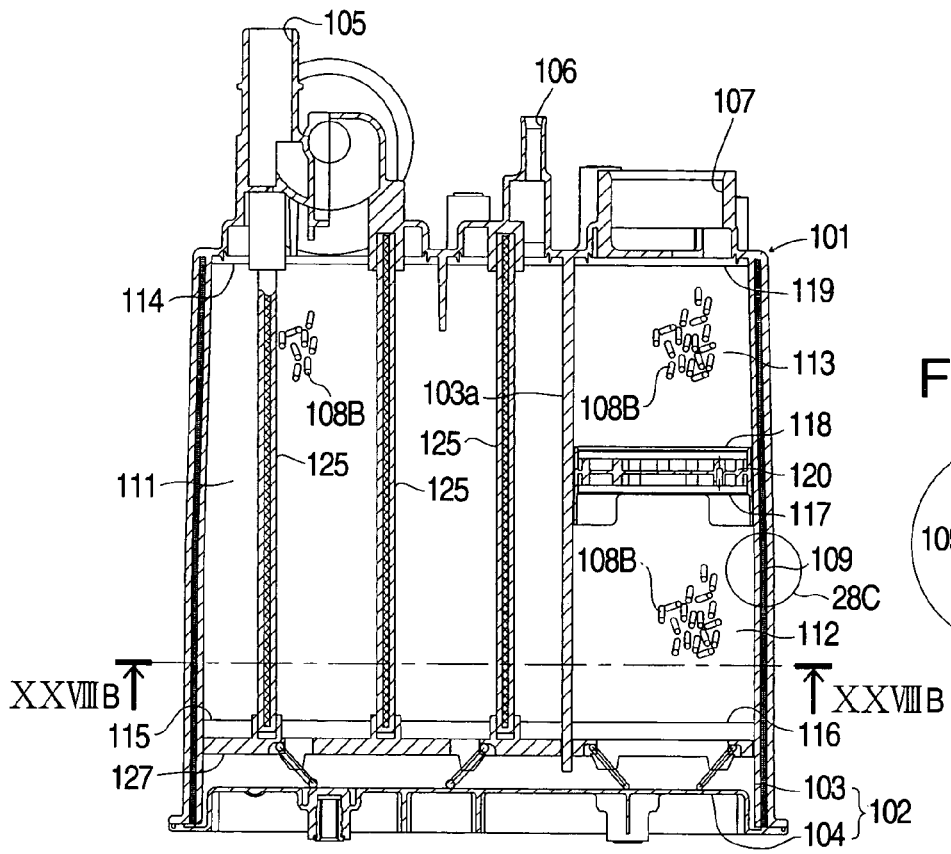
FIGS. 28A to 28C are diagrams of a canister in Embodiment 25 according to the present invention.
Figure 28C:
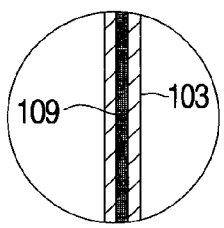
Figure 28B:
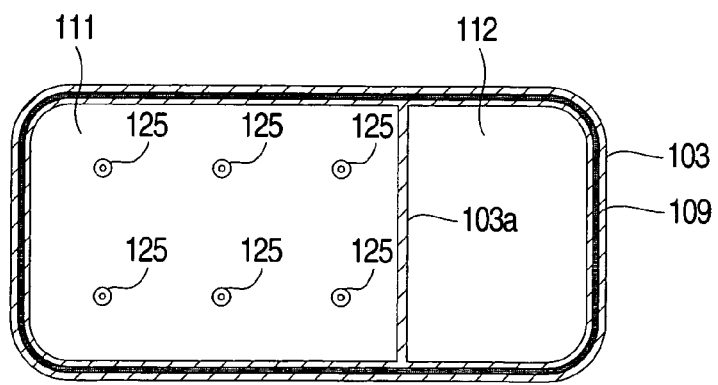

In Embodiment 25 shown in FIGS. 28A and 28B, an activated carbon disposed in each of adsorptive material chambers 111, 112, and 113 is the same as that of the Embodiment 20 described with reference to FIGS. 22A, 22B, that is, an activated carbon 108B constituted by dispersedly kneading a thermal storage material 109 therein. Moreover, as shown in FIG. 28A, in this Embodiment 25, a plurality of heat pipes 125 extending in a vertical direction in the drawing are arranged in the main adsorptive material chamber 111. An upper end of each of these heat pipes is supported by a ceiling portion of a case body 103, and each lower end is supported by a holding plate 127 which is allowed to abut on the bottom of a holding filter 115, so that the heat pipe is vertically disposed. Six heat pipes 125 in total are disposed as shown in FIG. 28B.

Thermal conductivity of the activated carbon 108B is poor. Therefore, when gasoline vapor is adsorbed or purged, temperature easily becomes non-uniform in each adsorptive material chamber in the Embodiments 17 to 20 shown in FIGS. 19 to 22B. For example, when fuel supply to a fuel tank (not shown) is started, and the gasoline vapor flows from a tank port 105 into the main adsorptive material chamber 111, there is first a rise in temperature of the activated carbon in the vicinity of an inlet (shown upper portion) to the main adsorptive material chamber 111. The heat pipes 125 receive the heat to conduct the heat to the activated carbon 108B of another portion. Therefore, the heat pipes function so as to homogenize a temperature distribution in the main adsorptive material chamber 111.

Therefore, there is eliminated a temperature difference depending on a position of the activated carbon charged in the main adsorptive material chamber 111, and the temperature distribution is homogenized in the main adsorptive material chamber 111. In addition to restrain of a temperature rise or drop in the presence of a thermal storage material 109, the temperature is homogenized (averaged) owing to the heat conduction of the heat pipes. Since a temperature change in the adsorptive material chamber is accordingly restrained, adsorbing and purging performances of a canister can further be improved in this Embodiment 25 as compared with the Embodiments 17 to 20. It is to be noted that in the present embodiment, the thermal storage material 109 is charged and confined in the case body 103, and this function of the thermal storage material also restrains the temperature change of the activated carbon 108B. This respect will be described in more detail in next Embodiment 26.

Embodiment 26

Figure 29A:
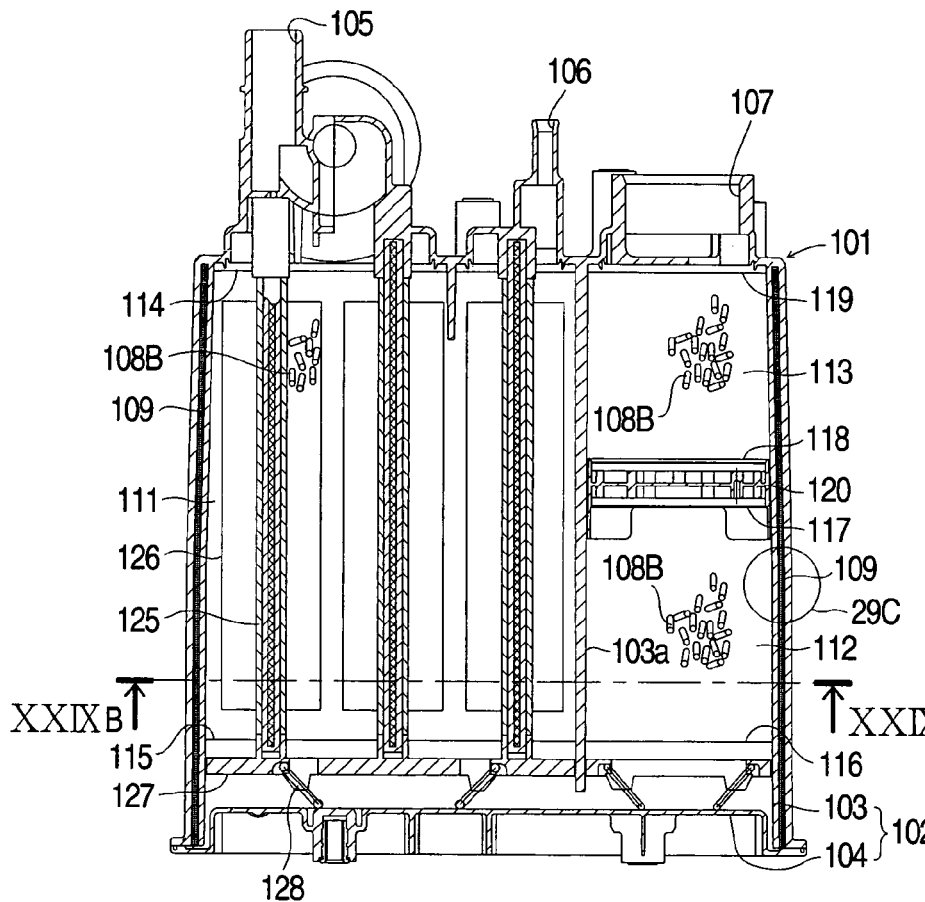
FIGS. 29A to 29C are diagrams of a canister in Embodiment 26 according to the present invention.
Figure 29C:
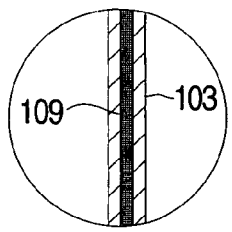
Figure 29B:
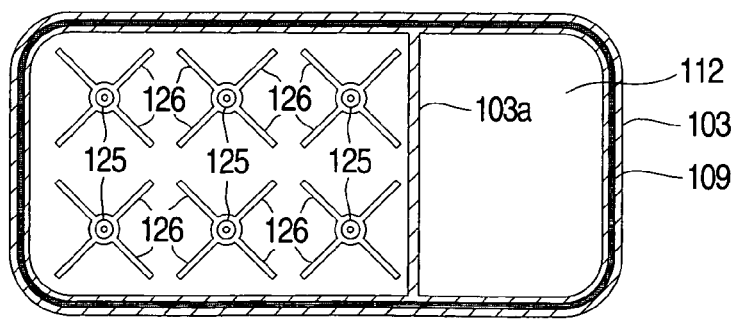

Embodiment 26 of FIGS. 29A, 29B, as compared with the Embodiment 25 of FIGS. 28A, 28B, is improved by attaching, to heat pipes 125, blade-shaped fins 126 as heat sinks. As shown in FIG. 29B, the fins 126 are formed into cross shapes. A length of this cross shape is set to be close to the whole height of a main adsorptive material chamber 111 from the ceiling to the vicinity of a bottom in a shown vertical direction in FIG. 29A. Accordingly, a heat conducting area of each heat pipe 125 is enlarged by the fin 126, a temperature distribution of an activated carbon 108B in the main adsorptive material chamber 111 is further homogenized (averaged), and this further improves adsorbing and purging performances of a canister.

It is to be noted that in FIG. 29A, a holding plate 127 is urged upwards by a compressive spring 128 disposed below to press a holding filter 115 onto the activated carbon 108B. In this Embodiment 26, as enlarged and shown in FIG. 29C, empty space is disposed in a peripheral wall of a case body 103, and the empty space is filled with a thermal storage material 109. After the empty space is filled, the space is sealed by allowing a lid 104 to abut on a lower end of the case body 103. In this case, a phase change substance constituting the thermal storage material 109 in the case body 103 restrains temperature rise and drop of the activated carbon 108B in the same manner as in a thermal storage material dispersedly kneaded in the activated carbon 108B, and adsorbing and purging performances of a canister are improved also from this respect.

It is to be noted that in the Embodiment 26, since the fins 126 attached to the heat pipes 125 extend in the shown vertical direction in FIG. 29A, any fluid resistance is not generated against the flow of gasoline vapor during fuel supply, and any fluid resistance is not generated even during purging.

It is to be noted that even in the canister of a first aspect such as the Embodiment 1 shown in FIG. 1, each heat pipe may be disposed in the adsorptive material chamber so as to direct a longitudinal direction of the heat pipe in a flow direction of the gasoline vapor, as in the Embodiment 25 shown in FIGS. 28A, 28B or the Embodiment 26 shown in FIGS. 29A, 29B.

Embodiment 27

Figure 30:
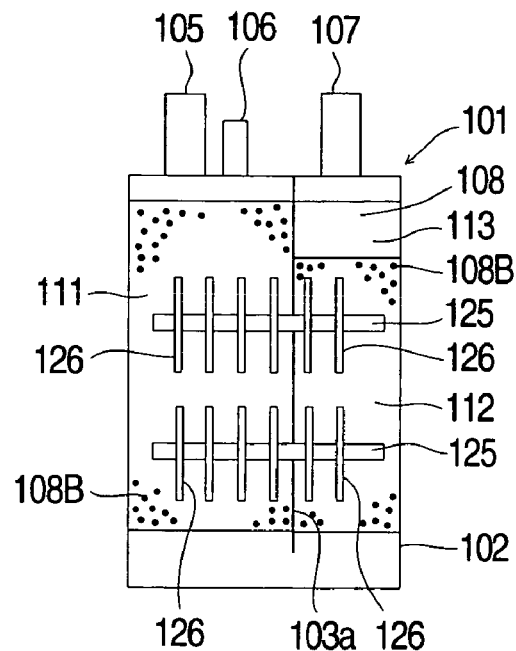
FIG. 30 is an explanatory view schematically showing a structure of a canister in Embodiment 27 according to the present invention.

FIG. 30 is a schematic diagram showing Embodiment 27 according to the present invention. In the present embodiment, an activated carbon 108B is contained in a main adsorptive material chamber 111 and a second adsorptive material chamber 112, and a third adsorptive material chamber 113 contains an activated carbon 108 which does not include any thermal storage material or an activated carbon including only a thermal storage material 109B.

Heat pipes 125, 125 extend through a partition plate 103a between the main adsorptive material chamber 111 and the second adsorptive material chamber 112, and are extended between both of the adsorptive material chambers 111 and 112. To each of the heat pipes 125, a plurality of fins 126 are attached in parallel to one another, and extended in a shown vertical direction crossing an axial line of the heat pipe at right angles. Some of the fins 126 attached to one heat pipe 125 are surely positioned in the main adsorptive material chamber 111, and the other fins are positioned in the second adsorptive material chamber 112. In this case, the fins function so as to reduce a temperature difference between the activated carbon 108B in the main adsorptive material chamber 111 and the activated carbon 108B in the second adsorptive material chamber 112.

It is to be noted that as the activated carbon contained in the main adsorptive material chamber 111 and the second adsorptive material chamber 112, there may be used the activated carbon 108A constituted by dispersedly coating thermal storage materials 109 on the surface of the pellet-shape activated carbon 108 as described in the Embodiment 19 with reference to FIGS. 21A, 21B, or the activated carbon 108 into which the thermal storage materials are dispersedly mixed as in the Embodiment 18 of FIG. 20.

Embodiment 28

Figure 31:
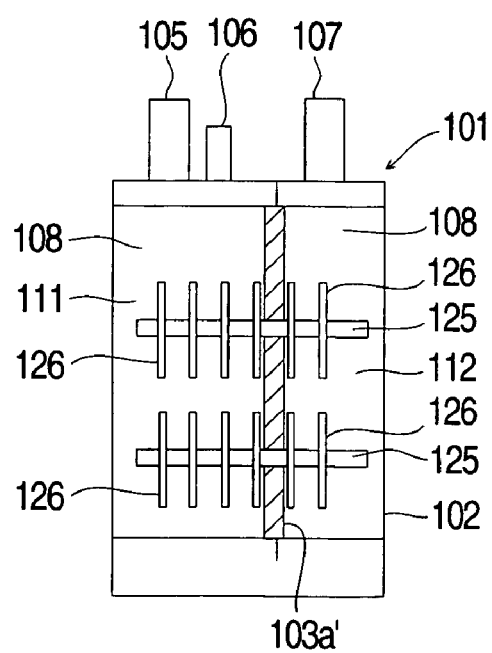
FIG. 31 is an explanatory view schematically showing a structure of a canister in Embodiment 28 according to the present invention.

FIG. 31 is a schematic diagram showing Embodiment 28 according to the present invention.

In the present embodiment, adsorptive material chambers are constituted of two chambers including a main adsorptive material chamber 111 and a second adsorptive material chamber 112, and there is constituted a canister having a so-called two-layer structure. Moreover, heat pipes 125 are extended between opposite layers (two chambers), and the heat pipes 125 and fins 126 function by means of heat conduction so as to reduce a temperature difference between the opposite layers (two chambers).

The opposite chambers 111, 112 contain the activated carbon 108 which does not include any thermal storage material. Moreover, a partition plate 103a' disposed between the opposite chambers 111 and 112 has a thickness larger than that in the embodiment of FIG. 29A. The partition plate 103a' is molded of Nylon 66®, and injection-molded while a thermal storage material 109 is kneaded. This changes a phase of a phase change substance of the thermal storage material in the partition plate 103a' depending on temperatures of activated carbons 108, 108 in the opposite chambers 111, 112. This latent heat restrains a temperature rise during adsorbing of gasoline vapor or a temperature drop during purging.

As described above, the temperature change is restrained utilizing the latent heat of the thermal storage material kneaded in the partition plate 103a', and the temperatures of the activated carbons 108, 108 are homogenized (averaged) owing to high thermal conductivities of the heat pipes 125 provided with the fins 126. This improves the adsorbing and purging performances of the canister, and restrains the discharge of the fuel vapor to the atmosphere.

It is to be noted that even in the canister of a first aspect such as Embodiment 1 shown in FIG. 1, the heat pipes provided with a plurality of fins may be extended between the adjacent adsorptive material chambers, as in the Embodiment 27 shown in FIG. 30 and the Embodiment 28 shown in FIG. 31.

As means for averaging (homogenizing) the temperature change of the activated carbon in the adsorptive material chamber, for example, the activated carbon may be mixed with graphite having a high thermal conductivity instead of using the heat pipes as in the Embodiment 26 of FIG. 29A and the like.

It is to be noted that even in the canister of the first aspect such as the Embodiment 1 shown in FIG. 1, the activated carbon may be mixed with graphite having the high thermal conductivity to average (homogenize) the temperature change of the activated carbon in the adsorptive material chamber as in the Embodiment 29.

Embodiment 30

As to a function temperature of a thermal storage material for use in a canister of the present invention, that is, a phase change temperature (melting point) of a phase change substance of the thermal storage material, it has been described that the temperature is set to −10 to 90° C. (preferably 10 to 45° C.) as described in the Embodiment 17. Alternatively, two types of materials are used as described in the Embodiment 21, and there are prepared and appropriately selectively used the first thermal storage material 109A in a range of 25° C. or more and 90° C. or less (preferably 25° C. or more and 45° C. or less) and the second thermal storage material 109B in a range of −10° C. or more and less than 25° C. (preferably 10° C. or more and less than 25° C.). However, in a law regulation prescribed so as to restrain discharge of a fuel evaporated gas to the atmosphere, the temperature conditions during testing are designated in a range of 20 to 30° C. Therefore, in view of this respect, in the present invention, the phase change temperature (melting point) of the phase change substance for use in a thermal storage material 109 (or 109A, 109B) is more preferably set to a predetermined temperature close to 25° C. This is referred to as Embodiment 30 according to the present invention.

The present embodiment is applicable to a vehicle such as an automobile using a gasoline fuel.

The invention claimed is:

1. A canister, comprising:
   a tank port which communicates with an upper gas chamber of a fuel tank;
   a purge port which communicates with a suction path of an engine;
   an atmospheric port opened to the atmosphere; and an adsorptive material chamber which contains an adsorptive material to adsorb an evaporated fuel flowing from the tank port to the atmospheric port, wherein
   a thermal storage material made of a phase change substance which absorbs and discharges latent heat in response to a temperature change or a thermal storage material microcapsule containing the thermal storage material in a microcapsule is contained in a sealed container and is disposed in the canister, especially in the vicinity of the adsorptive material in a state in which the thermal storage material or the microcapsule is not brought into direct contact with the evaporated,
   the sealed container including the thermal storage material or the thermal storage material microcapsule is made of a material having a specific heat or a thermal conductivity which is larger than that of the adsorptive material, and
   the thermal storage material made of the phase change substance which absorbs and discharges the latent heat in response to the temperature change or the thermal storage material microcapsule containing the thermal storage material is contained in the sealed container made of a material which does not pass any gasoline vapor to constitute pellets, and said pellets are contained in the adsorptive material chamber together with the adsorptive material.

2. The canister according to claim 1, wherein said sealed container containing the thermal storage material or the thermal storage material microcapsule is made of metal.

3. The canister according to claim 1, wherein said sealed container containing the thermal storage material or the thermal storage material microcapsule is made of a resin film laminated with metal foil.

4. The canister according to claim 1, wherein a metal plating is applied to an outer periphery of the storage material microcapsule.

5. The canister according to claim 1, wherein the material of the sealed container is a metal comprising at least one of a copper material, an aluminum material, an iron material, and a stainless steel material.

6. The canister according to claim 1, wherein the material of the sealed container is a resin comprising at least one of nylon, polyacetal, polyphenylene sulfide, and phenol.

7. The canister according to claim 1, wherein said thermal storage material is disposed in a thermal conduction state to said activated carbon, said thermal storage material being constituted by confining in a capsule, a sealed container, or a case body a phase change substance whose melting point is in a range of −10 to 90° C. and which absorbs and discharges latent heat in response to a temperature change.

8. The canister according to claim 7, wherein a nonwoven cloth made of a fiber having a thermal storage property by bonding the thermal storage material thereto is used in a holding filter which holds the activated carbon contained in the adsorptive material chamber.

9. The canister according to claim 7, wherein the melting point of the phase change substance is in a range of 10 to 45° C.

10. The canister according to claim 7, wherein there is disposed a first thermal storage material in which the melting point of the phase change substance is in a range of 25° C. or more and 90° C. or less and/or a second thermal storage material in which the melting point is in a range of −10° C. or more and less than 25° C.

11. The canister according to claim 10, wherein the first thermal storage material is not disposed near the atmospheric port.

12. The canister according to claim 10, wherein only the second thermal storage material is partially disposed near the atmospheric port.

13. The canister according to claim 7, wherein there is disposed a first thermal storage material in which the melting point of the phase change substance is in a range of 25 to 45° C. and/or a second thermal storage material in which the melting point is in a range of 10° C. or more and less than 25° C.

14. The canister according to claim 13, wherein the melting point of the phase change substance is set at a predetermined temperature close to 25° C.

15. The canister according to claim 1, wherein a heat pipe is disposed in the adsorptive material chamber so as to direct a longitudinal direction of the heat pipe in a flow direction of gasoline vapor.

16. The canister according to claim 15, wherein a fin is attached to the heat pipe.

17. The canister according to claim 1, wherein a heat pipe provided with a plurality of fins is bridged between adjacent adsorptive material chambers.

18. The canister according to claim 1, wherein graphite is mixed with an activated carbon contained in the adsorptive material chamber.

19. A canister, comprising:
   a tank port which communicates with an upper gas chamber of a fuel tank;
   a purge port which communicates with a suction path of an engine;
   an atmosphere port opened to the atmosphere; and
   an adsorptive material chamber which contains an adsorptive material to adsorb an evaporated fuel flowing from the tank port to the atmospheric port,
   wherein a thermal storage material made of a phase change substance which absorbs and discharges latent heat in response to a temperature change or a thermal storage material microcapsule containing the thermal storage material in a microcapsule is kneaded in a resin forming a peripheral wall of the adsorptive material chamber.

20. A canister, comprising:
   a tank port which communicates with an upper gas chamber of a fuel tank;
   a purge port which communicates with a suction path of an engine;
   an atmospheric port opened to the atmosphere; and
   an adsorptive material chamber which contains an adsorptive material to adsorb evaporated fuel flowing from the tank port to the atmospheric port, wherein a chamber is disposed in a case portion forming a peripheral wall of the adsorptive material chamber, and said chamber is filled with a thermal storage material made of a phase change substance which absorbs and discharges latent heat in response to a temperature change or a thermal storage material microcapsule containing the thermal storage material in a microcapsule.

* * * * *